US012551045B2

(12) United States Patent
Hensel et al.

(10) Patent No.: US 12,551,045 B2
(45) Date of Patent: Feb. 17, 2026

(54) GRINDER AND COFFEE MACHINE HAVING SUCH A GRINDER

(71) Applicant: Melitta Professional Coffee Solutions Gmbh & Co. KG, Minden (DE)

(72) Inventors: Armin Hensel, Rahden (DE); Bernd Buchholz, Rahden (DE)

(73) Assignee: Melitta Professional Coffee Solutions GmbH & Co. KG, Minden (DE)

(*) Notice: Subject to any disclaimer, the term of this patent is extended or adjusted under 35 U.S.C. 154(b) by 1002 days.

(21) Appl. No.: 17/622,286

(22) PCT Filed: Aug. 10, 2020

(86) PCT No.: PCT/EP2020/072422
§ 371 (c)(1),
(2) Date: Dec. 23, 2021

(87) PCT Pub. No.: WO2021/037546
PCT Pub. Date: Mar. 4, 2021

(65) Prior Publication Data
US 2022/0257045 A1 Aug. 18, 2022

(30) Foreign Application Priority Data
Aug. 27, 2019 (DE) ............. 10 2019 122 996.0

(51) Int. Cl.
*A47J 31/42* (2006.01)
*A47J 42/18* (2006.01)
(Continued)

(52) U.S. Cl.
CPC ............. *A47J 31/42* (2013.01); *A47J 42/18* (2013.01); *A47J 42/20* (2013.01); *A47J 42/44* (2013.01); *A47J 42/46* (2013.01); *A47J 2202/00* (2013.01)

(58) Field of Classification Search
CPC ........ A47J 2202/00; A47J 31/42; A47J 42/02; A47J 42/08; A47J 42/10; A47J 42/06;
(Continued)

(56) References Cited

U.S. PATENT DOCUMENTS

| 8,763,942 B2 | 7/2014 | Hergesell et al. |
| 2008/0190297 A1* | 8/2008 | Gussmann ............. A47J 31/42 |
| | | 426/507 |

(Continued)

FOREIGN PATENT DOCUMENTS

| DE | 1164040 B | 2/1964 |
| DE | 102016103806 A1 | 9/2017 |

(Continued)

OTHER PUBLICATIONS

International Search Report dated Oct. 26, 2020 issued in PCT/EP2020/072422 (with English Translation).

(Continued)

*Primary Examiner* — Sang Y Paik
*Assistant Examiner* — Bonita Khlok
(74) *Attorney, Agent, or Firm* — Collard & Roe, P.C.

(57) ABSTRACT

A grinder for grinding coffee beans having a first grinding tool and a second grinding tool forming a grinding nip, and the second grinding tool being rotatable relative to the first grinding tool. The grinder has at least one force generation device for applying a selectable force F to a first grinding tool or a second grinding tool, which force can be transmitted to the coffee beans. A coffee machine having such a grinder and a method for preparing coffee using said type of coffee machine and said type of grinder.

25 Claims, 18 Drawing Sheets

(51) Int. Cl.
*A47J 42/20* (2006.01)
*A47J 42/44* (2006.01)
*A47J 42/46* (2006.01)

(58) Field of Classification Search
CPC .. A47J 42/04; A47J 42/00; A47J 42/12; A47J 42/14; A47J 42/16; A47J 42/18; A47J 42/20; A47J 42/44; A47J 42/46; A47J 42/50; A47J 42/52; A47J 42/32–36
USPC .......................................................... 99/286
See application file for complete search history.

(56) References Cited

U.S. PATENT DOCUMENTS

| | | | | |
|---|---|---|---|---|
| 2008/0315021 | A1* | 12/2008 | Tang | A47J 42/08 241/169.1 |
| 2012/0138721 | A1* | 6/2012 | Hergesell | A47J 42/18 241/277 |
| 2015/0157167 | A1 | 6/2015 | Eicher et al. | |
| 2019/0117020 | A1 | 4/2019 | Mazzer | |
| 2020/0315401 | A1* | 10/2020 | Deuber | A47J 42/46 |
| 2021/0235934 | A1 | 8/2021 | Hensel et al. | |

FOREIGN PATENT DOCUMENTS

| | | |
|---|---|---|
| EP | 1493368 A1 | 1/2005 |
| EP | 2286699 A1 | 2/2011 |
| FR | 560932 A | 10/1923 |
| WO | 2015143677 A1 | 10/2015 |
| WO | WO 2016029355 * | 3/2016 |
| WO | 2020002493 A1 | 1/2020 |

OTHER PUBLICATIONS

German Search Report dated Jan. 28, 2020 issued in the corresponding German Application DE102019122996.0 (with English translation of relevant parts).

* cited by examiner

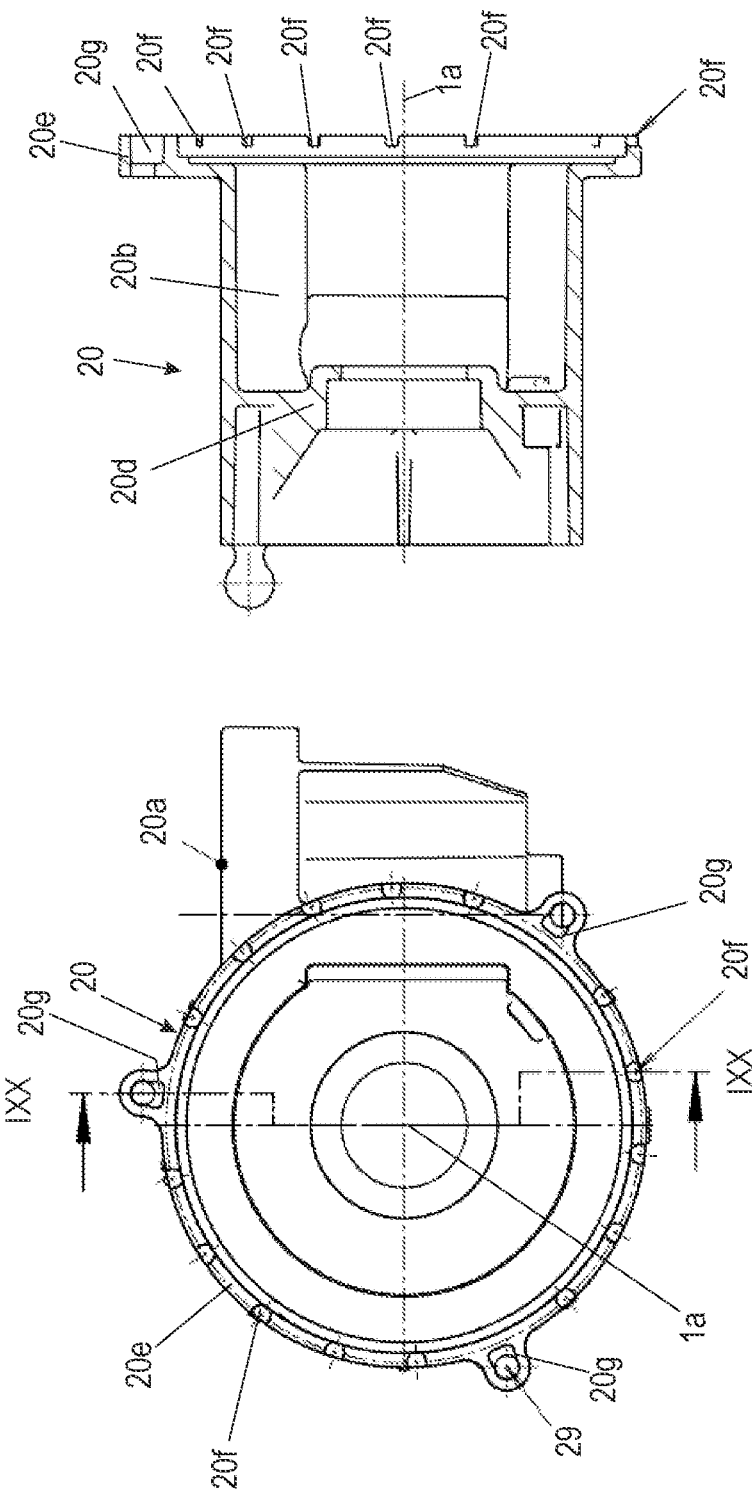

GRINDER AND COFFEE MACHINE HAVING SUCH A GRINDER

CROSS REFERENCE TO RELATED APPLICATIONS

This application is the National Stage of PCT/EP2020/072422 filed on Aug. 10, 2020, which claims priority under 35 U.S.C. § 119 of German Application No. 10 2019 122 996.0 filed on Aug. 27, 2019, the disclosures of which are incorporated by reference. The international application under PCT article 21(2) was not published in English.

BACKGROUND OF THE INVENTION

The invention relates to a grinder for grinding coffee beans and to a coffee machine, in particular a fully automatic coffee machine, having such a grinder.

The right fineness of the coffee powder is a prerequisite for successful coffee preparation. It determines the speed with which the water can flow through the coffee powder and the period of time in which aromas and flavors can be extracted from the coffee powder. This time is called extraction time and is a quality criterion for the appropriate extraction of the flavors and aromas of the respective coffee beverage.

In addition to contact pressure, water temperature, water quality and bean properties, the extraction intensity of a coffee beverage is significantly influenced by the degree of grinding of the coffee grounds. The degree of grinding describes the fineness with which the bean is ground. The grinding process of coffee beans produces a fineness distribution, i.e. not all coffee particles have the identical size, but are subject to a grain size distribution typical for coffee.

The finer the grind, the greater the total particle surface area and consequently the contact time of the water with the coffee powder.

The degree of grinding of the coffee powder can usually be adjusted in coffee machines with grinders. High-quality machines even allow infinitely variable adjustment of the grinder and compensate for undesirable boundary conditions (e.g. thermal expansion, grinding disc wear, etc.) by readjusting the grinder components. Some systems use the extraction time of the coffee beverage as an indirect characteristic to check the appropriate grinder setting.

For the preparation of a high-quality coffee beverage, the appropriate and product-related setting of the grinding degree plays an overriding role.

In the prior art, there are essentially two proven types of coffee grinders that are used in coffee machines. One is a disc grinder and the other is a cone grinder. Both types of grinders have in common that they consist of two grinding tools, wherein one of these tools is fixed and the other is driven. The rotational movement of one of the grinding tools draws the beans into a grinding gap and grinds them finer and finer as the grinding gap narrows. The smallest distance between the two grinding tools is decisive for the degree of grinding produced in the coffee powder. To change the degree of grinding, the fixed tool can be adjusted relative to the rotating tool so that the distance is varied. These systems are geometry-based methods for changing the degree of grinding.

Thus, according to the technical teaching of EP 2 286 699 B1, it is provided that the grinder for a coffee machine comprises a first grinding disc which can be driven about an axis of rotation by a drive means and comprises a second grinding disc. The second grinding disc is fixed in a screw-in part which can be screwed into a housing and can be rotated with respect to the housing by adjusting means. This allows a grinding gap between the two grinding discs to be adjusted. The adjusting means are formed by a drive wheel arranged coaxially with respect to the screw-in part, which drive wheel cooperates with an adjusting wheel rotatable via adjusting means. The grinder further comprises a feed opening for feeding the coffee beans to be ground and a discharge opening for discharging the coffee ground between the two grinding discs. The grinder has a central adjustment facility for adjusting the grinding gap, which operates in an infinitely variable manner.

An existing problem of these grinding systems is the determination of a zero point at which a minimum fineness can be defined. Only if this is successful can a grinding degree suitable for the product be set directly and precisely in relation to this zero point. The prerequisite for this is particularly high manufacturing accuracy in the overall design of the grinder (e.g. high axial run-out accuracy in the disc grinder).

Furthermore, in conventional coffee grinders, disturbing influences such as thermal expansion of the grinder components, grinding disc wear, bean changes, etc. can only be compensated for indirectly (e.g. by evaluating the extraction time). Heat influences in particular lead to varying degrees of grinding and different swelling behavior of the coffee powder in the brewing unit and are thus the main cause of fluctuating extraction times.

As a result, long adjustment cycles are often required in order to adjust the grinder of a coffee machine ideally to the desired product and taste profile. Furthermore, the degree of grinding can usually only be set for and regulated to a specific product.

In the patent specification EP1493368B1 a further possibility of the admission is described. The grinding discs are screwed into the respective carrier by means of a bayonet catch. For this purpose, there are elongated interrupted projections on the circumference of the discs, which are inserted into the carrier slot by means of a plug-in rotary movement. Since the grinder is only ever operated in one direction of rotation, the disc and carrier are locked against rotation and the discs are also locked in the axial degree of freedom.

SUMMARY OF THE INVENTION

The invention has the object of further developing a generic grinder in a functionally advantageous manner.

The invention solves this problem by a grinder a coffee machine and a method as described below:

A grinder according to the invention is used for grinding coffee beans. It can be used as a stand-alone device or integrated in a coffee machine, for example a fully automatic coffee machine.

The grinder has two grinding disc carriers, each with a grinding tool, a drive unit and at least one force-generating device. The at least one force-generating device for applying an adjustable force F to a first grinding tool or a second grinding tool, which is transmitted to the coffee beans, wherein the force F is directed in such a way that it presses the respective grinding tool to which the force F is applied in the direction of the respective other grinding tool, is designed with an adjusting device for the force F.

The grinder includes a first grinding tool and a second grinding tool.

The grinding tools form a grinding gap or delimit such a grinding gap from opposite sides. This gap can be flat or can increase towards the center.

The second grinding tool is thereby rotatable relative to the first grinding tool, in particular rotatably driven by a drive unit such as a drive motor.

The force-generating device adds a further adjustable force to the dead weight of the grinding tools, which is applied by the force-generating device. The force F is directed in such a way that it presses the respective grinding tool to which the force F is applied, in particular axially in the direction of the respective other grinding tool. The force-generating device thus presses the two grinding tools together and not—as known from the prior art—away from each other.

The application of force virtually replaces the support of the grinding tool on an abutment—with an adjustable force, a product-specific optimum degree of grinding can be achieved which remains largely constant even under changed process conditions.

Advantageously, it may be provided that by applying force with a process force of the force-generating device adjustable by means of the adjusting device, a product-specific degree of grinding can be repeatedly adjusted. In this respect, it can also be provided that when the type of coffee or the product type (e.g. from espresso to cafe cream) is changed when the product is drawn from a fully automatic coffee machine in which the grinder is integrated, a product-specific setting or adjustment of the degree of grinding is automatically carried out. This setting of the degree of grinding can be carried out extraordinarily quickly with the invention, for example in order to change from a setting of the degree of grinding for an espresso to a setting of the degree of grinding for a cafe creme. Since the setting or changeover is very fast, it may even be possible to dispense with a second grinder in a fully automatic coffee machine.

Accordingly, the invention creates an advantageous method for preparing a coffee with a coffee machine, in particular with a fully automatic coffee machine, and with a grinder according to one of the preceding claims relating thereto, in which coffee beans are ground with the grinder and in which a coffee of a certain type is prepared from the coffee beans and water in a brewing unit. Depending on the type of coffee, a setting or adjustment of the degree of grinding is automatically carried out by means of the adjusting device prior to grinding when the type of coffee is changed (depending on the amount of water and the amount of ground coffee and possibly depending on additives such as milk), e.g. when changing from an espresso to a cafe creme.

During operation of the grinder, one of the two grinding tools can be stationary and the second of the two grinding tools can be rotated by a drive unit, for example a drive motor. However, both grinding tools can also rotate, in particular in opposite directions to each other.

The force-generating device can act on both the first and the second grinding tool, so that a more even distribution of force occurs. However, it is constructively simpler if the force-generating device only acts on one grinding tool, in particular the stationary one of the two grinding tools.

Further, a respective force-generating device may also act on the first grinding tool and the second grinding tool.

In one embodiment, the adjusting device comprises an adjusting ring having a ramp and an adjusting element, wherein the ramp is in engagement with the first grinding disc carrier. This results in an advantageously simple and compact structure.

In this respect, it is of space-saving advantage if the first grinding disc carrier comprises the first grinding tool, a filling hopper, and a carrier, wherein the carrier is in engagement with the ramp of the adjusting ring, and wherein the first grinding tool is arranged with an axial degree of freedom and is connected to the filling hopper via at least one spring, in particular a compression spring.

In a further embodiment, the at least one spring exerts an axial force on the first grinding tool, wherein a pretensioning force of the at least one spring is adjustable by means of the adjusting ring of the adjusting device. The spring is a low cost, high quality component and may be formed in many different embodiments.

It should be noted that it is not primarily important which of the grinding tools (also referred to as "cutting tools" in the following)—driven or stationary grinding tool—has a degree of freedom in the direction of the process force and is actively subjected to a force in this direction. The force adjustment can be automatic (e.g. drive motor) or manual (e.g. adjusting wheel). In the case of drive-motor adjustment, a control loop is conceivable, wherein the degree of grinding is changed if the last extraction times deviate from the set run-out time.

The constructive implementation of a force control can be realized in different ways. One possibility is to compress the mechanical spring by a certain distance x with a known force-distance characteristic.

For an advantageously simple adjustment, the adjusting ring is rotatably mounted on a grinding housing of the grinder.

A further embodiment provides that the adjusting ring surrounds a receiving section of the grinding housing and is rotatably guided on a circumferential collar of the grinding housing, wherein the first grinding disc carrier is arranged in the receiving section of the grinding housing. In this way, an advantageously space-saving structure can be made possible.

In a still further embodiment, the adjusting ring is provided with an external toothing with which the adjusting element engages.

It is also advantageous if the force-generating device comprises at least the one spring and the adjusting device for adjusting a pretensioning force of the spring, in particular in the form of a servomotor. This variant is structurally particularly easy to implement and it is readily controllable and/or adjustable.

However, there are also other solutions for applying a defined force to one of the cutting tools. First of all, a pneumatic approach is conceivable here, wherein one grinding disc carrier can be actively pressed against the other with variable air pressure. A passive variant would be a gas pressure spring with a fixed force-displacement characteristic, in which case only a specific degree of grinding would be adjustable in the grinder. However, springs are also available with variable gas pressure. Alternatively, however, it can also be provided that the force-generating direction is based on a fluid operating principle. Since the distance between the grinding tools or cutting tools in the disc grinder only has to change slightly by up to 0.2 mm as a function of the process force during grinding, hydraulic solutions with fluids of higher compression modules are also possible for controlling the force. Even then, a damping effect would be present in the system during grinding. For example, a rubber diaphragm can be used to apply force, which is filled with water via an adjustable pressure reducer. A hydraulic water system is already present in coffee machines and could be used to regulate the degree of grinding.

Furthermore, the force-generating device can also advantageously be based on an electromagnetic principle. In this solution, the movable cutting tool carrier is pressed against the fixed one due to a variable magnetic force. Since the magnetic force changes with increasing distance between the armature and the yoke, a balance of forces can also be established in an electromagnetic system during the grinding process between the cutting tools.

Thus, in another embodiment, the force-generating device can be based on a pneumatic operating principle, on a fluid operating principle or/and on an electromagnetic operating principle.

In another embodiment, the adjusting device is independent of an operating or resting state of the grinder. In this way, the adjusting device can be actuated both in the operating state of the grinder, i.e. when it is being driven to grind coffee beans, and in the idle state of the grinder, i.e. when it is stationary.

The grinder can be designed as a disc or roller or cone grinder. The adjusting device thus has an advantageously wide range of application.

In one embodiment, during operation of the grinder, one of the two grinding tools is stationary and the second of the two grinding tools is rotatably operated by the drive unit, in particular by a drive motor. This results in an advantageous structure.

The force-generating device may comprise a device for adjusting a pretensioning force of the spring, in particular the compression spring, in particular in the form of a servomotor. This servomotor is preferably an actuator which is controlled and/or regulated by a control and/or evaluation unit.

The setting of the servomotor can be adjusted depending on
a) the coffee beans, in particular the type of bean and its degree of roasting,
b) the temperature of the grinder and/or
c) a degree of wear of the grinder.

For example, the type of coffee beans can be specified by manual setting or determined on the basis of the power of the drive motor for driving the grinding tool or tools. In this case, the determined power is compared within the scope of an actual/setpoint value comparison with a data record stored on the control and/or evaluation unit with regard to the power as a function of the force to be applied to achieve a specific degree of grinding or with regard to a bean type as a function of the force to be applied to achieve a specific degree of grinding.

It is advantageous if the first grinding tool and the second grinding tool are coupled to a respective grinding tool carrier via latching lugs on a circumference of the respective grinding tool, since in this way a simple assembly and also a quick change are possible. At the same time, the latching lugs enable a torque transmission to the respective grinding tool.

In a still further embodiment, it is provided that the drive unit comprises a drive shaft, a gear housing and a drive motor, wherein the drive shaft is coupled to the second grinding disc carrier for driving the second grinding tool, is in engagement with the drive motor indirectly via a gear or directly, and is rotatably mounted in the gear housing. This results in an advantageously compact structure.

The drive shaft may be engaged with the drive motor via a worm gear, wherein the drive shaft is connected to a worm wheel of the worm gear, and wherein the drive shaft is engaged with the second grinding tool via a carrier section.

Such a multifunctional design of the drive shaft with the carrier section results in several advantages: Firstly, fewer joining operations are required for the assembly of the grinder. The reduced number of components also results in a particularly cost-effective and compact design. Finally, in addition to the very good axial run-out properties of the carrier section, a large upper bearing automatically provides a seal between the greased gear area and the grinding housing, which is mounted above the upper bearing on a flange of the gear housing.

In one embodiment, the drive shaft is integrally formed with the worm wheel and the carrier section.

In an alternative embodiment, the drive shaft may be formed in two parts, wherein a first part of the drive shaft comprises the carrier section, and wherein a second part of the drive shaft comprises a worm wheel. This allows for a very compact and space-saving structure.

Another embodiment provides that the gear housing is connected to a grinding housing of the grinder, wherein different positions of an ejection section of the grinding housing are fixed relative to a position of the drive motor of the gear housing. An advantage of this is that it is easy to adapt the grinder to different coffee machines.

In order to nest several grinders as compactly as possible in coffee machines, it is advantageous that the ejection position on the circumference can be varied in several positions. For this purpose, in one embodiment the different positions of the ejection section of the grinding housing are defined as different angular positions relative to a grinder axis by depressions or recesses formed in a flange of the gear housing, which are in engagement with respective cams or pins of the grinding housing.

A still further embodiment provides that the grinder comprises a grinding degree indicator with an indicator. An advantage of this is that a specific grinding degree can always be set in a repeatable manner.

In this regard, it is advantageous if the grinding degree indicator interacts with the adjusting device and indicates a grinding degree of the grinder by means of an indicator.

In one embodiment, the grinding degree indicator may interact with an external toothing of an adjusting ring of the adjusting device to advantageously indicate the direct position of the adjusting ring corresponding to a particular degree of grinding.

In another advantageous embodiment, the grinding degree indicator may comprise an adjusting drive and may adjust the adjusting ring of the adjusting device to adjust a degree of grinding and simultaneously indicate the adjusted degree of grinding.

During the grinding process, a force is generated by the cutting of the beans, with which the cutting tools (grinding discs) are pressed apart. The stronger the force applied by the process force or counteracting force-generating device, the finer the degree of grinding. If there are no more beans, the disc-like grinding tools are braced against each other with the contact force. Since the grinding tools are usually designed in such a way that they cannot get caught in each other, consequently the grinder cannot fail.

However, in the event of a malfunction of an empty bean hopper, grinding noises and damage to the face surface of the grinding discs could occur. In addition, there may be undesirable heat effects that can have a negative impact on the quality of the coffee grinding. In the case of cone grinders, this could even lead to blockage of the cutting tools. To solve this problem, it can be advantageously provided that the grinder comprises a stop, in particular an adjustable stop, for setting a minimum degree of grinding.

In this respect, it can be provided in particular that the axially movable tool part or the corresponding grinding tool is pressed against a stop. This end stop can be set before the grinder is put into operation and at the same time defines the minimum degree of grinding to be produced. When force is applied, ideally there should only be a minimum gap between the cutting tools. If a greater contact force is later specified than the process force during the grinding process, a ground product with the fineness of this grinding disc gap is produced.

For this purpose, it is provided in a further embodiment that the grinding degree indicator comprises at least one stop which defines a minimum or/and maximum degree of grinding to be produced.

In practice, the touching point (beginning of audible grinding noises) of grinding disc grinders is an indicator for the zero point of the grinder. However, this is strongly dependent on the axial run-out of the grinding discs and the individual hearing sensation of the fitter of the grinder.

Further advantageous designs are disclosed in the remaining subclaims.

In the following, the invention will be described in more detail by means of an exemplary embodiment with reference to the drawings. The figures serve only to explain the invention in more detail and are not restrictive of the invention. Individual features described may also be applied in their own right to further embodiment variants within the scope of the general skill in the art, wherein:

BRIEF DESCRIPTION OF THE DRAWING FIGURES

FIG. 1: shows a schematic front view in section of a first exemplary embodiment of a grinder according to the invention for grinding coffee beans;

FIG. 2: shows a schematic exploded view of a second exemplary embodiment of a grinder according to the invention;

FIG. 3: shows a schematic exploded view of a drive unit of the grinder according to the invention according to FIG. 2;

FIG. 4: shows a schematic sectional view of the drive unit of the second exemplary embodiment according to FIGS. 2-3;

FIGS. 5-6: show schematic representations of a first grinding disc carrier of the second exemplary embodiment according to FIGS. 2-3:

FIG. 7: shows a schematic exploded view of a grinding housing of the second exemplary embodiment according to FIGS. 2-3;

FIGS. 8-10: show schematic views of the grinding housing and an adjusting ring according to FIG. 7;

FIGS. 11-12: show schematic views of a grinding disc of the second exemplary embodiment according to FIGS. 2-3;

FIGS. 13-14: show schematic views of a drive shaft of the second exemplary embodiment according to FIGS. 2-3;

FIGS. 15-16: show schematic views of a variation of the first grinding disc carrier according to FIGS. 5-6;

FIGS. 17-19: show schematic views of the gear housing and grinding housing of the second exemplary embodiment according to FIGS. 2-3;

DETAILED DESCRIPTION OF THE INVENTION

Figure 1:
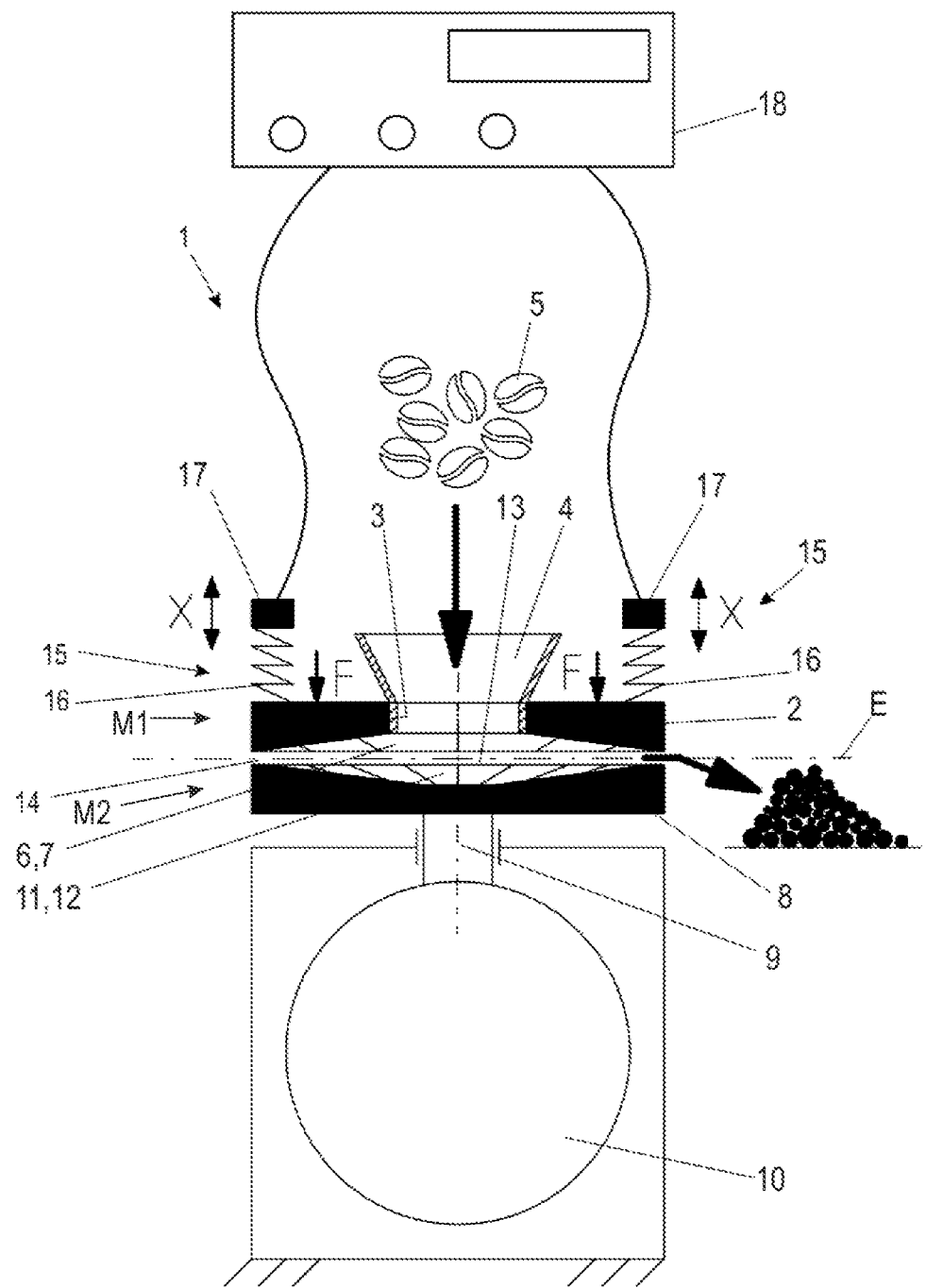

In FIG. 1, a schematic front view in section of a first exemplary embodiment of a grinder 1 according to the invention for grinding coffee beans 5 is shown. The grinder 1 has a grinder axis 1*a*, a first grinding disc carrier M1 with a first grinding tool 2, a second grinding disc carrier M2 with a second grinding tool 8 and a drive unit AE. The grinding tools 1,2 are formed here as so-called grinding discs. The first grinding tool 2 is mounted in a rotationally fixed manner in a housing not shown in FIG. 1, which will be described further below. In this respect, the first grinding tool 2 is stationary during operation of the grinding unit 1.

The first grinding tool 2 has a cylindrical envelope geometry and a centric aperture 3. The grinding tool 2 can also be designed differently, for example as a grinding cone. The aperture 3 is penetrated here by a feed hopper 4. Coffee beans 5 to be ground are fed to the grinder 1 through the feed hopper 4 and the aperture 3. The grinder 1 may also be provided for grinding other luxury foods or foodstuffs, but preferably it is provided for grinding coffee beans 5. The feed hopper 4 is advantageously designed in such a way that undesirable bridging of the coffee beans 5 in the feed hopper 4 is prevented.

The first grinding tool 2 has a conical depression 6 on its side facing away from the feed hopper 4. The depression 6 has at least one grinding edge 7.

The second grinding tool 8 of the second grinding disc carrier M2 is arranged coaxially to the grinding axis 1*a* and to the first grinding tool 2, and below the first grinding tool 2. The term "below" refers to the drawing plane of FIG. 1. The second grinding tool 8 is rotatably mounted in a housing not shown here, which will be described in more detail below. In this respect, the second grinding tool 8 rotates during operation of the grinder 1.

The second grinding tool 8 also has a cylindrical envelope geometry. The second grinding tool 8 can also be designed differently, for example as a grinding cone. The second grinding tool is rotatable relative to the first grinding tool 2 about the grinding axis 1*a*. Here, the second grinding tool 8 is connected to a drive shaft 9 of a drive motor 10 of the drive unit AE in a rotationally fixed manner, so that the second grinding tool 8 is set into a rotational movement during operation of the grinder 1 while the first grinding tool 2 is stationary.

This is advantageous, but not mandatory. Alternatively, the first grinding tool 2 can be rotatable while the second grinding tool 8 is stationary. It is also possible that both grinding tools 2, 8 are rotatable—for example in opposite directions of rotation and/or at different speeds, so that there is always a relative movement between both grinding tools 2, 8.

The drive shaft 9 is shown here only symbolically and will be described in detail later.

Alternatively, a shaftless direct drive is also possible, in which one of the grinding tools 2, 8 is the rotor of the drive motor 10, or an indirect drive, in which the drive motor 10 acts on one of the grinding tools 2, 8 via a gear.

The second grinding tool 8 has a conical depression 11 on its side facing away from the drive motor 10. The depression 11 has at least one grinding edge 12.

The conical depression 6 of the first grinding tool 2 and the conical depression 11 of the second grinding tool 8 thus form a kind of double conical grinding chamber 13, which opens at its outer circumference into a grinding gap 14. A collecting device (not shown here) can be connected to the grinding gap 14, which collects the coffee beans—preferably coffee powder—emerging from the grinding gap 14 and feeds them to an extraction process.

The grinding tools 2, 8 form the grinding gap 14 or delimit this grinding gap 14 from opposite sides. This grinding gap 14 may be flat or may increase towards the center. It preferably defines a plane E, preferably a symmetry plane. The grinding gap 14 extends over the plane E.

The grinder 1 further comprises at least one force-generating device 15. The force-generating device 15 acts here on the first grinding tool 2, thereby causing a respective force F to act continuously on coffee beans located between the first grinding tool 2 and the second grinding tool 8. This is advantageous, but not mandatory. The force-generating device 15 can also act on the second rotatable grinding tool 8 or on both grinding tools 2, 8.

Here, the force-generating device 15 comprises two compression springs 16 which can be pretensioned by a corresponding device 17, for example by a servomotor, by a variable pretensioning distance X, so that the respective force F acting on the first grinding disc 2 and thus on the coffee beans is variable or adjustable in its amount.

The compression springs 16 exert an axial force perpendicular to the plane E on the first and/or second grinding tools 2, 8 which can be adjusted or varied in this way.

The force-generating device 15 can also be designed differently than shown in FIG. 1. The force effect is essential here, wherein the amount of the force F is preferably variable or adjustable. In this case, the force-generating device 15 can also be designed in such a way that the amount of the force F is regulated automatically and/or continuously as a function of higher-level operating parameters of a coffee machine. The force-generating device 15 is explained in detail below by means of an exemplary embodiment.

This makes it advantageously possible to carry out a defined presetting of a specific degree of grinding, since the force F correlates with the respective degree of grinding—i.e. the size distribution of the ground coffee particles, characterized by the particle size of a 50% median—of the ground coffee, which, however, will not be further discussed here.

Furthermore, the force acting on the coffee beans by the grinder 1 can advantageously be adjusted by the force-generating device 15 depending on the coffee beans 5 to be ground and the respective desired degree of grinding. Preferably, for this purpose, data records relating to the respective degree of grinding, the type of bean and the force to be generated by the force-generating device 15 are stored on a data memory of a control and/or evaluation unit 18 for controlling a coffee machine and, in particular, the grinder 1. The aforementioned control and/or evaluation unit 18 can be associated with the grinder 1 or be part of a coffee machine, for example a fully automatic coffee machine.

An adjustment of the degree of grinding C can therefore be regulated in a bean-specific manner (e.g. hard/strongly roasted beans vs. less strongly roasted café crème beans). Alternatively, it is possible to adjust the degree of grinding to a specific type of bean by determining the difference in grinding performance at constant force and then using this difference as a factor for the force adjustment.

Furthermore, the force-controlled adjustment of the respective degree of grinding enables a permanent reproducibility of the degree of grinding even in case of grinding tool wear. For this purpose, a characteristic curve for wear over time can be stored depending on the type of bean. The number of grinding processes can be weighted differently depending on the type of bean used. Thus, after, for example, 100 grinding operations of a "hard" bean type, a readjustment can be carried out by the device 17.

Likewise, the force-controlled adjustment of the respective degree of grinding can advantageously compensate for thermal expansion effects, in particular of the grinding tools 2, 8. For this purpose, a temperature sensor (not shown) can detect the heat of the coffee beans as they leave the grinder 1 and, taking into account the coefficients of thermal expansion of the material of the grinding tools 2, 8, adjust the force of the force-generating device 15, in particular the pretensioning force of the compression springs 16, accordingly.

Figure 2:
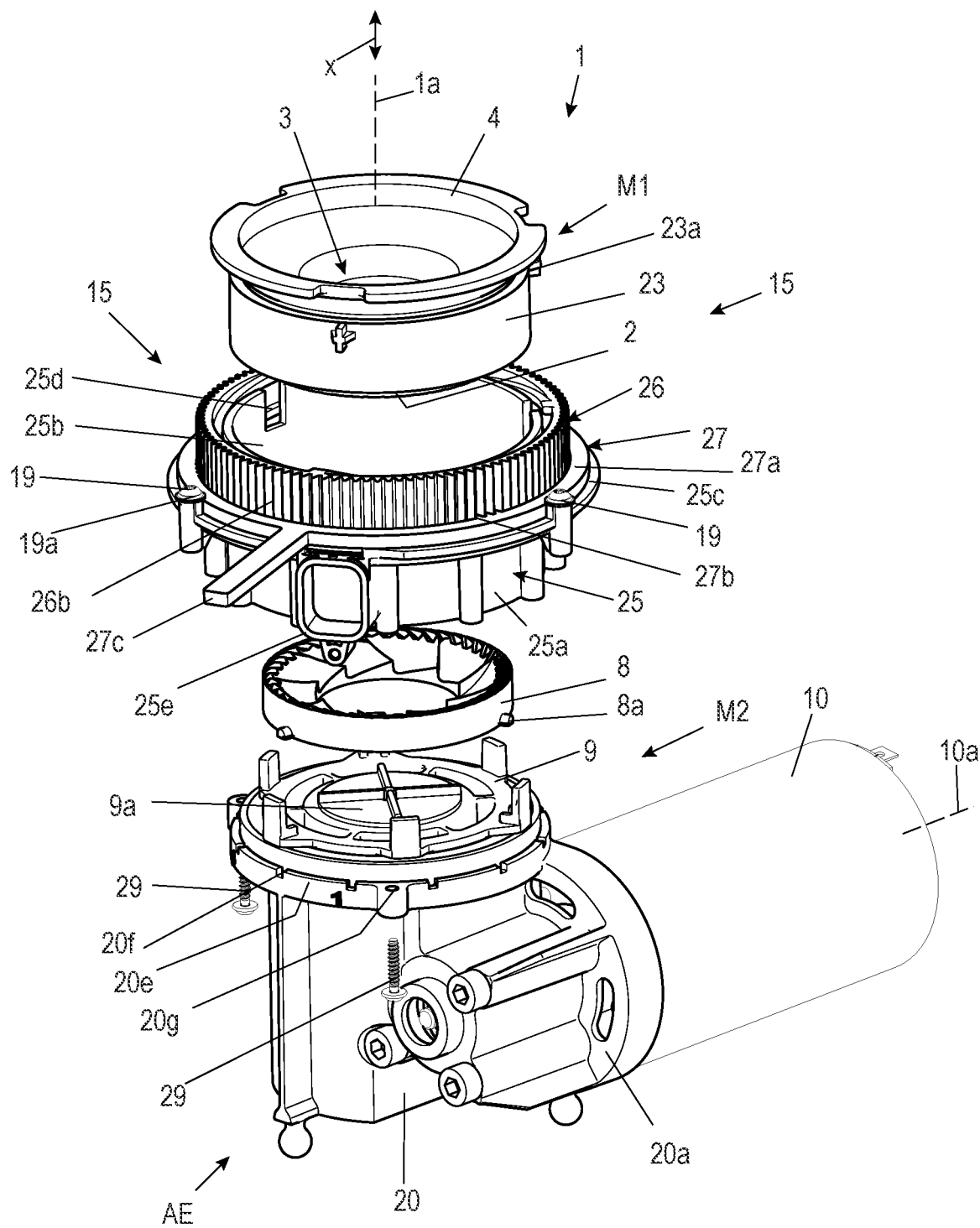

FIG. 2 shows a schematic exploded view of a second exemplary embodiment of a grinder 1 according to the invention.

The first grinding disc carrier M1 includes the first grinding tool 2, the feed hopper 4, and a carrier 23 having lugs 23a distributed on its outer periphery. The first grinding disc carrier M1 is also called the upper grinding disc carrier M1 and is described in further detail below.

The force-generating device 15 has three compression springs 16 (see FIG. 5) arranged in the first grinding disc carrier M1, which will be explained below.

The adjusting device 17 comprises an adjusting ring 26 and an adjusting element 27. The adjusting device 17 is attached to a grinding housing 25 and interacts with the first grinding disc carrier M1. This will be explained in more detail below.

The grinding housing 25 comprises a bottom section 25a and a receiving section 25b, which are arranged one above the other and connected to each other. Surrounding this connection is a circumferential, radially outwardly projecting collar 25c.

The grinding housing 25 is arranged coaxially to the grinder axis 1a and receives the first grinding disc carrier M1 in the receiving section 25b. Here, the lugs 23a of the carrier 23 engage with axially extending openings 25d in the wall of the receiving section 25b of the grinding housing 25.

The adjusting ring 26 of the adjusting device 17 is provided with an external toothing 26b, surrounds the receiving section 25b of the grinding housing 25 and is rotatably guided with its lower side on the circumferential collar 25c of the grinding housing 25.

The adjusting element 27 has an annular section 27a to which tooth sections 27b are integrally formed in a regularly distributed manner on its inner diameter. The tooth sections 27b are formed as internal teeth corresponding to the external toothing 26b. The adjusting element 27 is arranged around the external toothing 26b of the adjusting ring 26 in such a way that the tooth sections 27b are in engagement with the external toothing 26b, and that the underside of the adjusting element 27 rests rotatably on the collar 25c of the grinding housing 25. Fastening elements 19 with washers 19a are arranged in a regularly distributed manner around the circumference of the collar 25c and form an axial fixing of the adjusting element 27 (see also FIG. 7).

By means of a radially outwardly projecting actuating section 27c, for example in the form of a lever, the adjusting element 27 and thus the adjusting ring 26 in engagement therewith can be rotated about the grinder axis 1a. With this rotation, the adjusting device 17 adjusts the force-generating device 15 to adjust the force F. This will be further discussed below.

The bottom section 25a of the grinding housing 25 includes an ejection section 25e which is open radially outwardly. The bottom section 25a further accommodates the second grinding tool 8.

The second grinding disc carrier M2 is also referred to as the lower grinding disc carrier M2, and thus comprises the second grinding tool 8 and the bottom section 25a of the grinding housing 25.

The second grinding tool 8 is mounted on a carrier section 9a of the drive shaft 9, and is in a rotationally fixed connection therewith via projections 8a. This will be described in more detail below.

The drive shaft 9 is disposed in an interior 20b of a gear housing 20 of the drive unit AE. In this example, the drive motor 10 having a drive motor shaft 10a is attached to the gear housing 20 via a screw-on flange 20a of the gear housing 20.

The grinding housing 25 is mounted on a flange 20e of the gear housing 20, here facing upwards towards the grinding disc carriers M2, M1, by means of fastening elements 29, for example screws. In this case, the bottom section 25a surrounds the second grinding tool 8. The grinding housing 25 can be mounted on the flange 20e of the gear housing 20 in different angular positions relative to the grinding tool axis 1a. These angular positions are defined by recesses 20f formed in the flange 20e, which are in engagement with respective cams 28 (see FIG. 17). This will be further explained in connection with FIGS. 17 to 19.

Figure 3:
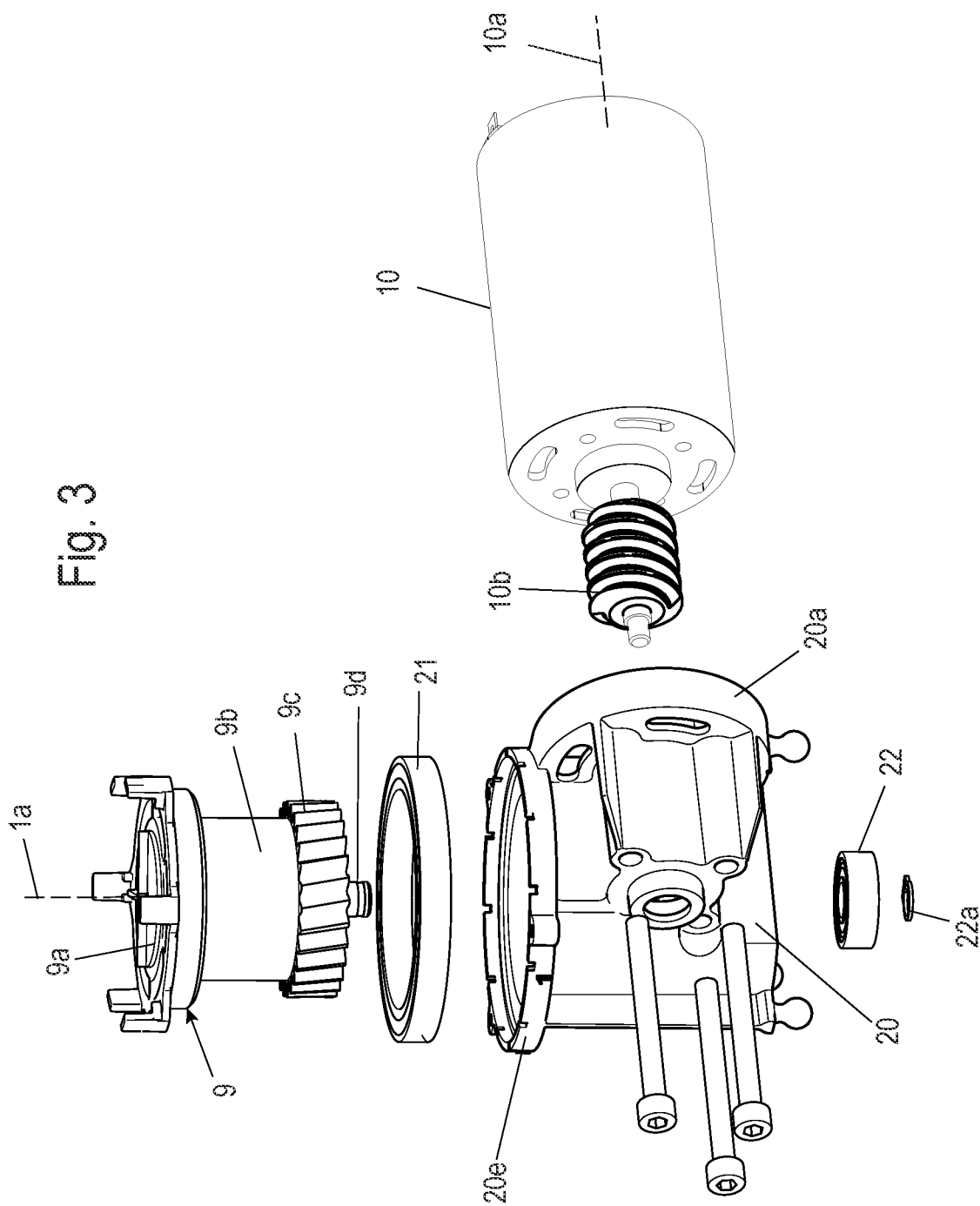
Figure 4:
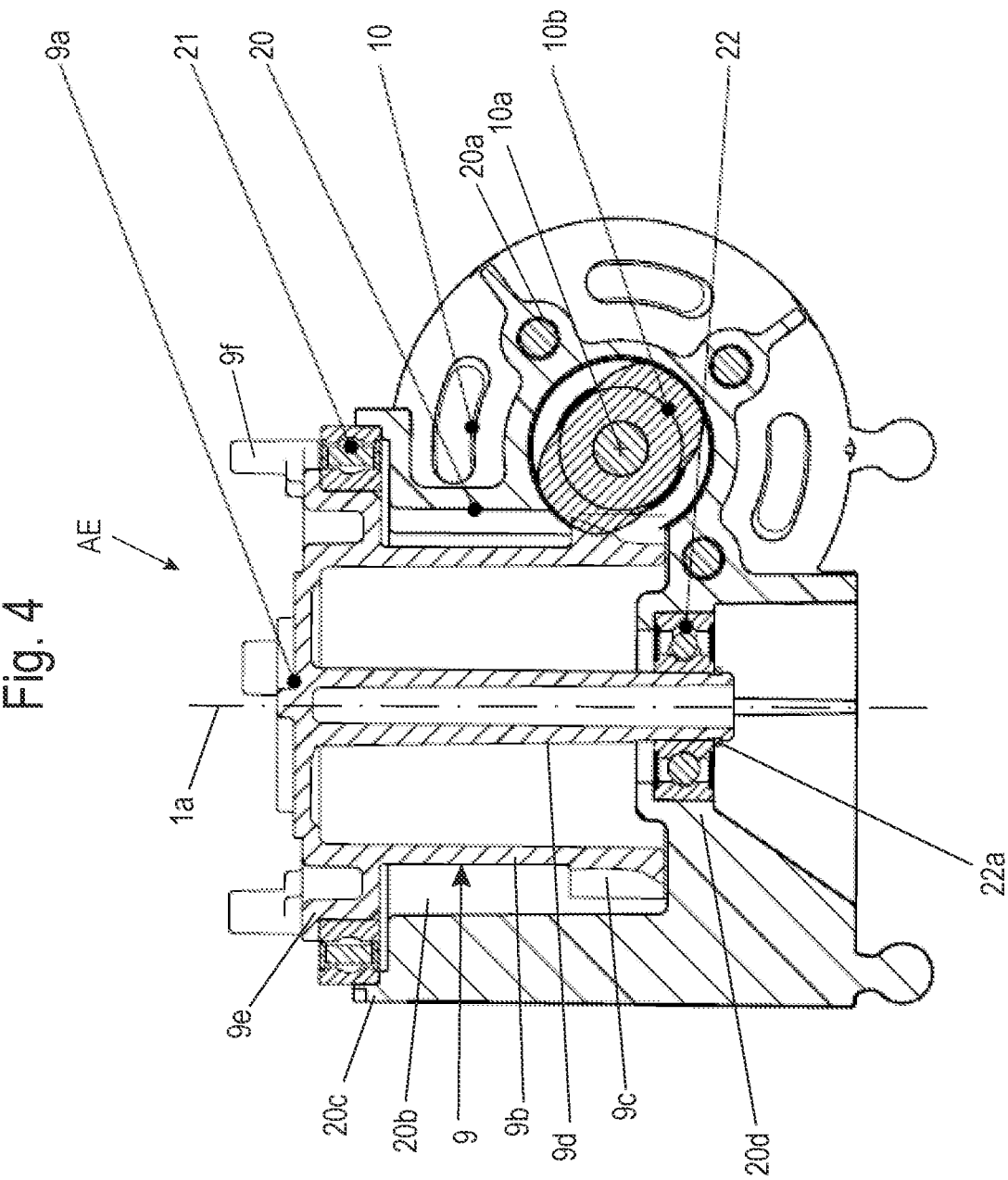

FIG. 3 shows a schematic exploded view of the drive unit AE of the grinder 1. In addition, FIG. 4 shows a schematic sectional view of drive unit AE of the exemplary embodiment according to FIGS. 2-3.

In this exemplary embodiment, the drive unit AE comprises a worm gear between the drive shaft 9 and the drive motor 10.

The drive shaft 9 comprises the carrier section 9a, a body 9b, a toothing 9c and a bearing journal 9d.

The drive shaft 9 is a hollow cylinder of circular cross-section forming the body 9b, which is here closed at its upper end by the carrier section 9a.

The carrier section 9a is of plate-shaped design and is provided on its upper surface, which faces the grinding housing 25, with a driver and ejector geometry of the grinder 1. On the outer periphery of the carrier section 9a, tab-like projections are arranged in a regularly distributed manner and protrude from the carrier section 9a.

Thereunder, the carrier section 9a is provided with a circumferential wall in which a bearing seat 9e is formed. An outer diameter of this bearing seat 9e is larger than the outer diameter of the body 9b.

A toothing 9c is formed on the lower free end of the body 9b of the drive shaft 9, which forms a worm wheel of the worm gear and engages with a toothing 10b of the drive motor 10 formed as a worm.

A bearing journal 9d is centrally disposed within the hollow-cylindrical body 9b and has one end integrally formed on the inner surface of the grinding carrier section 9a. The other, free end of the bearing journal 9d protrudes beyond the lower edge of the body 9b.

In this way, the drive shaft 9 with the lower carrier section 9a is formed so as to simultaneously perform the function of the worm wheel of the worm gear.

For optimal accommodation of the drive shaft 9 in the gear housing 20, the drive shaft 9 is rotatably supported about the grinder axis 1a by an upper bearing 21 and a lower bearing 22 in the gear housing 20. The bearings 21, 22 are, for example, sealed or covered bearings.

The inner ring of the upper bearing 21 shown in FIG. 4 is used up on the bearing seat 9e of the drive shaft 9, and is of such a size that the worm wheel with the toothing 9c on the body 9b of the drive shaft 9 can be inserted through this upper bearing 21 for assembly. The outer ring of the upper bearing 21 is inserted into a bearing seat 20c of the gear housing 20. This bearing position with the upper bearing 21 substantially takes over the axial process forces during the grinding operation.

For radial guidance of the drive shaft 9 and the worm wheel with the toothing 9c at the lower end of the body 9b, the free end of the bearing journal 9d forms a bearing seat for the inner ring of the lower bearing 22, for example a radial deep groove ball bearing. The outer ring of the lower bearing 22 is accommodated in a bearing seat 20d of the gear housing 20.

It is also conceivable to design the gear between the drive shaft, which is designed as a multi-functional part, as a belt gear or spur gear, if a belt or spur gear is desired in the grinder 1.

The multifunctional design of the drive shaft 9 with the carrier section 9a results in several advantages: Firstly, fewer joining operations are required for the assembly of the grinder 1. Furthermore, the reduced number of components results in a particularly cost-effective and compact structure. Finally, in addition to the very good axial run-out properties of the carrier section 9a, the large upper bearing 21 automatically provides a seal between the greased gear area (in the interior 20b of the gear housing 20) and the grinding housing 25, which is fixed above the upper bearing 21 on the flange 20e of the gear housing 20 as described above.

Figure 5:
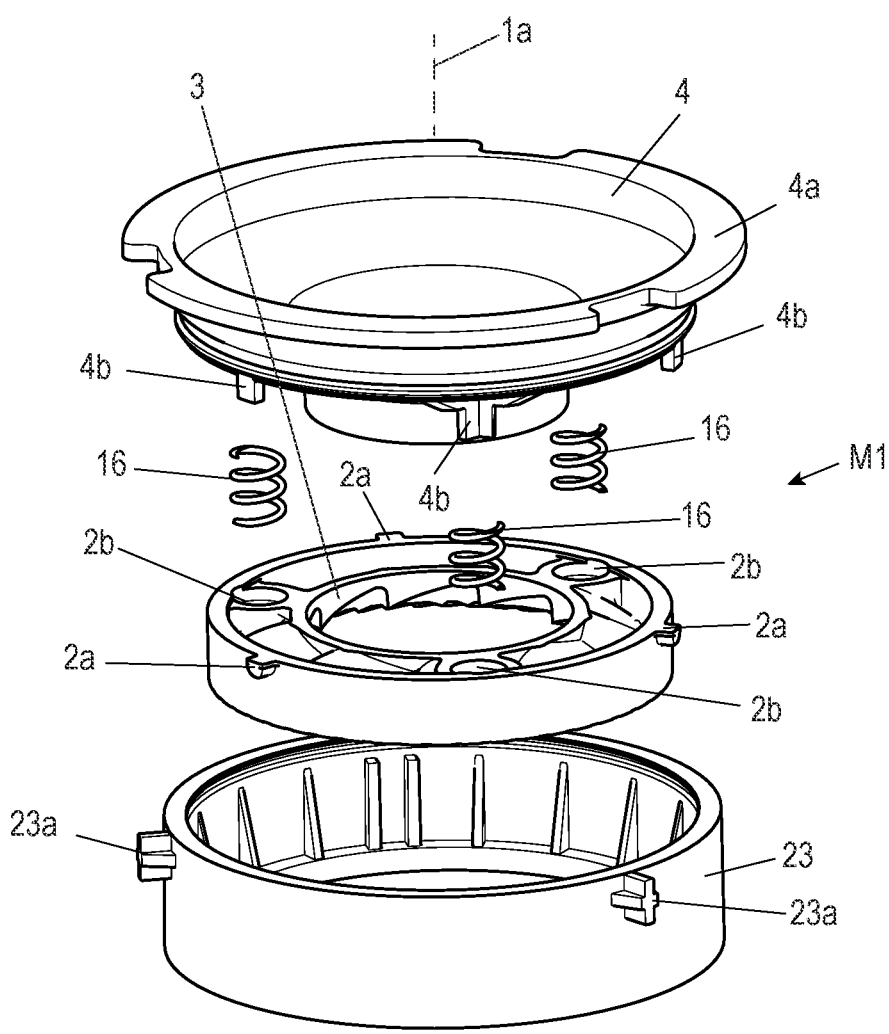
Figure 6:
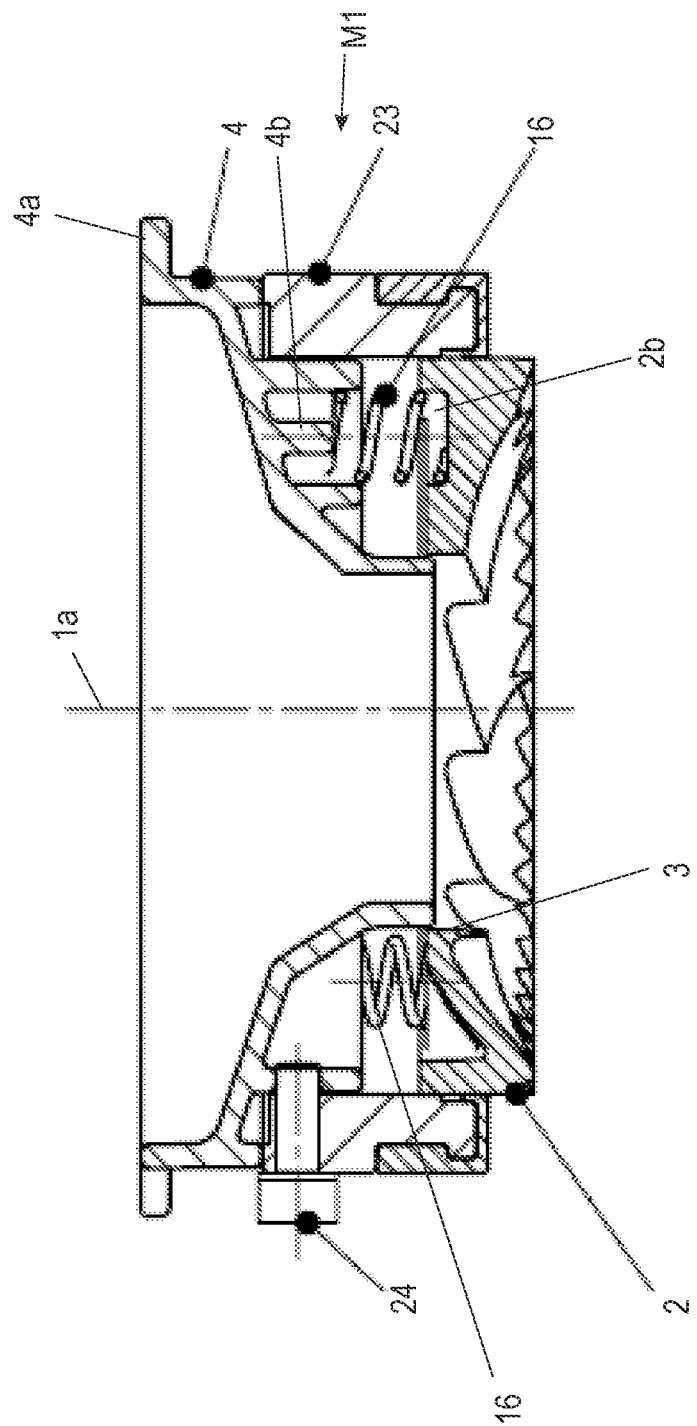
Figure 7:
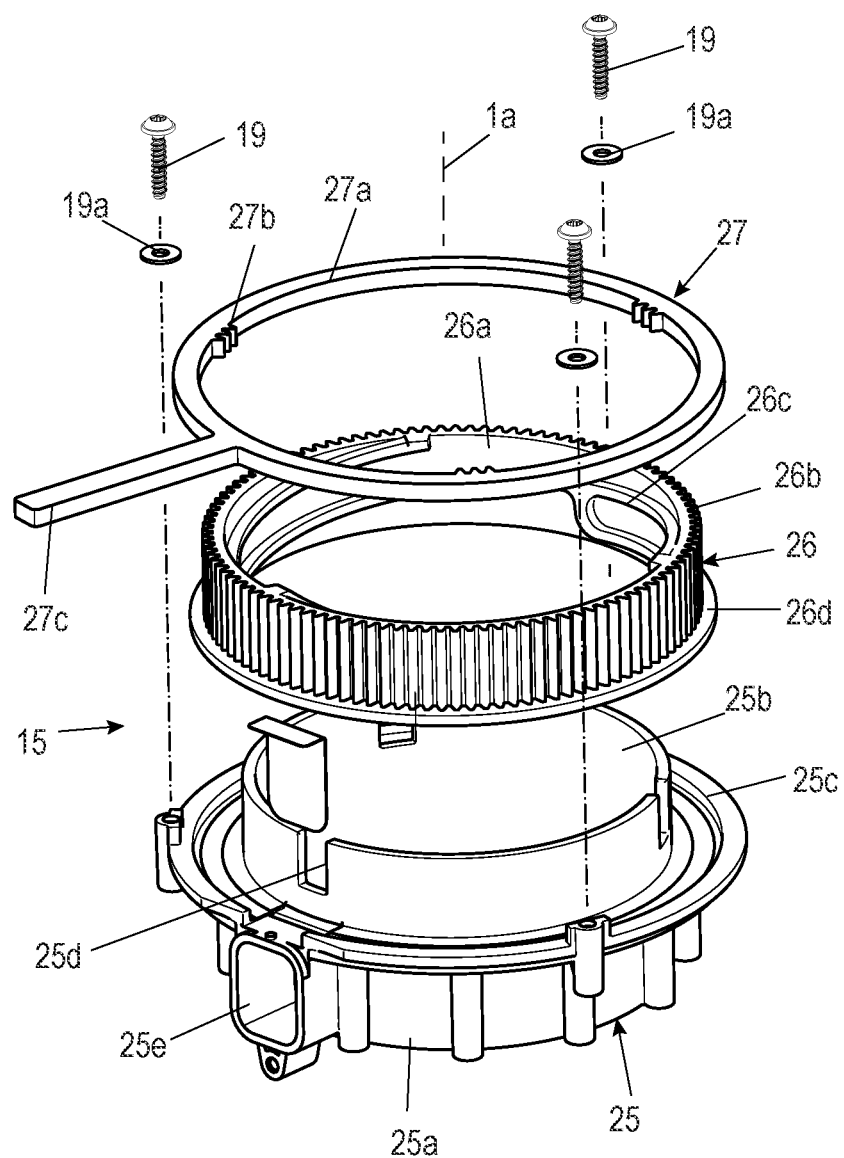
Figure 10:
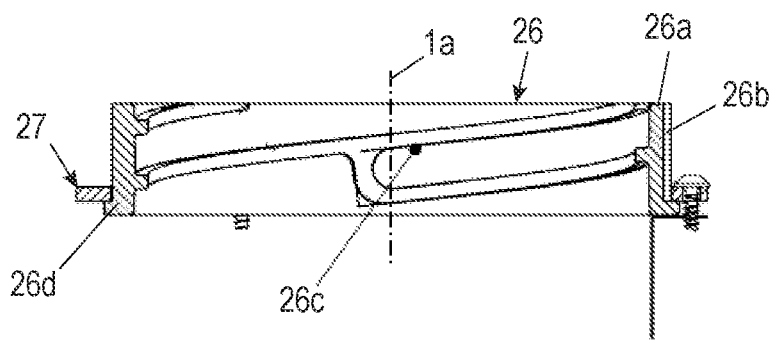
Figure 9:
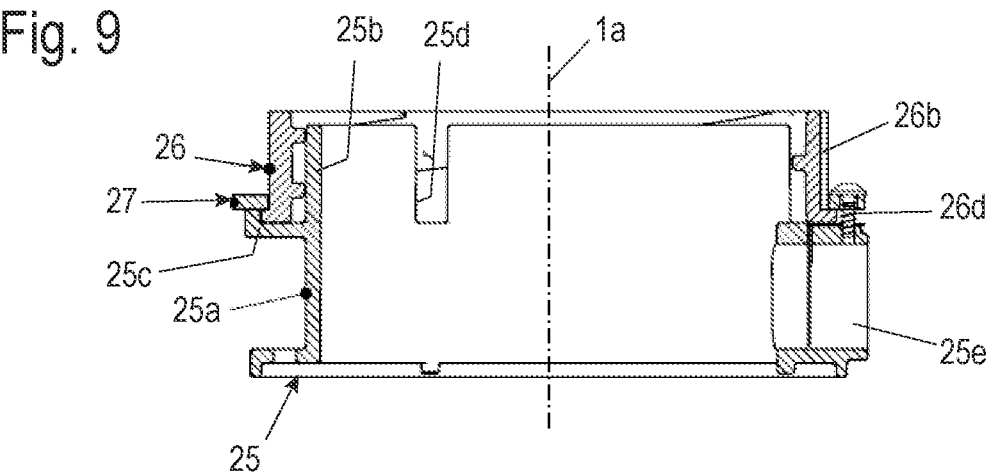
Figure 8:
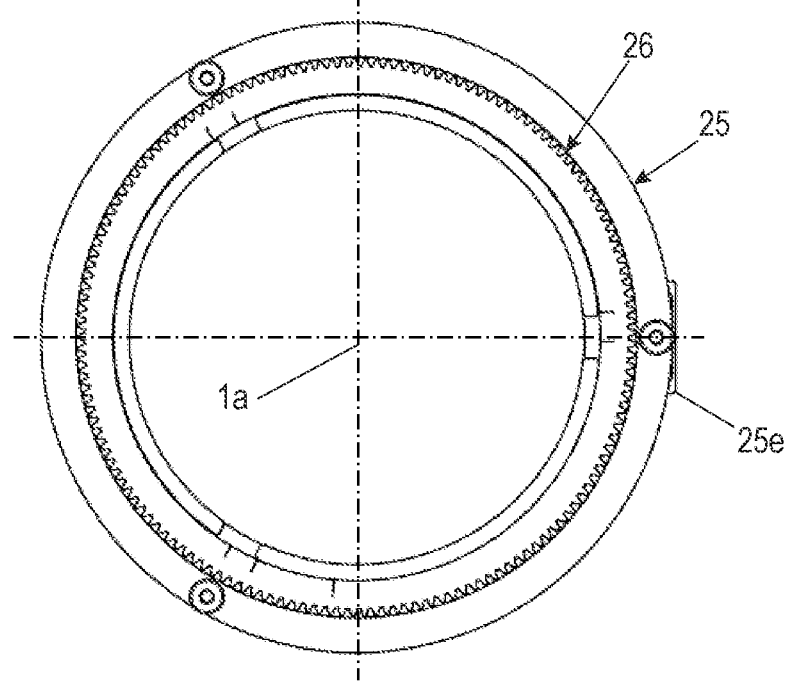

FIG. 5 shows a schematic exploded view of the first grinding disc carrier M1 of the second exemplary embodiment according to FIGS. 2-3. FIG. 6 shows a schematic sectional view of the first grinding disc carrier M1. FIG. 7 shows a schematic exploded view of the adjusting device 17. FIG. 8 shows a schematic top view of the grinding housing 25. FIG. 9 shows a schematic sectional view of the grinding housing 25, adjusting ring 26 and adjusting element 27. FIG. 10 shows a schematic sectional view of the adjusting ring 26.

The upper or first grinding disc carrier M1 comprises the first grinding tool 2, which is spring-loaded with compression springs 16, is guided in the carrier 23 and is braced with three fastening elements 24, for example screws, and the feed hopper 4.

The first grinding tool 2 has one axial degree of freedom.

Here, the compression springs 16 form the force-generating device 15 and are guided on the feed hopper 4 at projections 4b facing the first grinding tool 2 with one end in each case and are each accommodated with their other end in receptacles 2b of the first grinding tool 2.

The compression springs 16 are arranged symmetrically about the grinder axis 1a in order to achieve an optimally distributed application of force. More than the three compression springs 16 shown can also be provided.

A helical spring is preferred as the compression spring 16 for the present application. However, springs or spring assemblies of other types can also be used.

The pretension of the compression springs 16 advantageously corresponds to the value which leads to a desired maximum degree of grinding (for example for filter coffee).

The further pretension of the compression springs 16 is generated by rotating the adjusting ring 26 of the adjusting device 17 about the grinder axis 1a.

The adjusting ring 26 has a hollow-cylindrical wall 26a, which is provided on the outside with the external toothing 26b. A ramp 26c is formed on the inner side of the wall 26a. This adjusting ring 26 is axially fixed to the grinding housing 25 and can be rotated about the grinder axis 1a by means of the adjusting element 27. The rotational movement of the adjusting ring 26 moves the entire first or upper grinding disc carrier M1 axially in the direction of the grinder axis 1a in such a way that the compression springs 16 are further braced and the first grinding tool 2 is even more strongly sprung, depending on the angle of rotation, because the upper grinding disc carrier M1 is guided via three screw heads of the fastening elements 24 in three grooves of the ramp 26c in the adjusting ring 26, each groove extending uniformly along the circumference of the inner wall of the adjusting ring 26. The screw heads of the fastening elements 24 extend through the openings 25d through the wall of the receiving section 25b of the grinding housing 25 into the ramp 26c of the surrounding adjusting ring 26.

The system can be flexibly adapted to a wide variety of gradations of the degree of grinding via the spring rate of the compression springs 16 and the ramp gradient of the ramp 26c.

Moreover, the adjusting ring 26 can be positioned in such a way that the entire upper grinding disc carrier M1 can be removed from the grinder 1. This is particularly advantageous with regard to cleaning and maintenance of the grinder 1.

In particular, the upper grinding disc carrier M1 can also be made in one piece. In this case, the two parts are pressed together directly via latching lugs 2a attached to the first grinding tool 2. The lugs prevent the first grinding tool 2 from falling out of the carrier 23. Further joining processes, such as screw connections, can be omitted.

As a rule, grinding discs as grinding tools in disc-type grinders are fixed to the respective carriers by means of screw-on holes with screws. On the one hand, these holes reduce the cutting performance of the grinding disc. On the other hand, coffee grounds can deposit in these areas and are therefore not completely discharged from the grinder.

Figure 12:
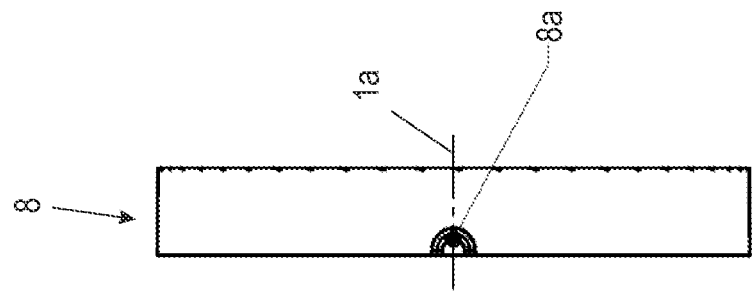
Figure 11:
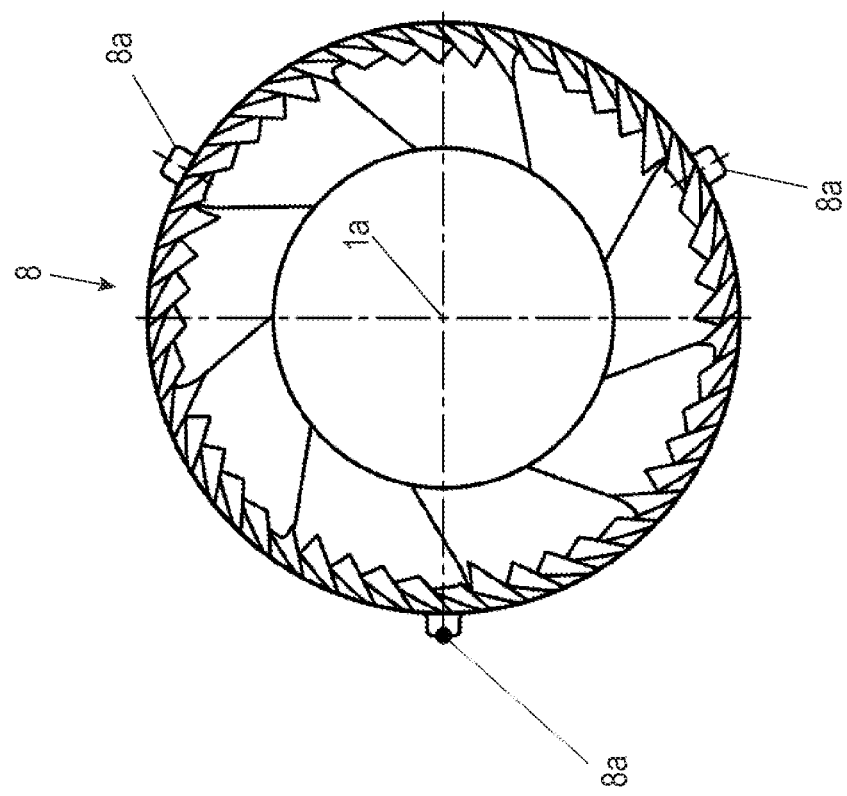
Figure 14:
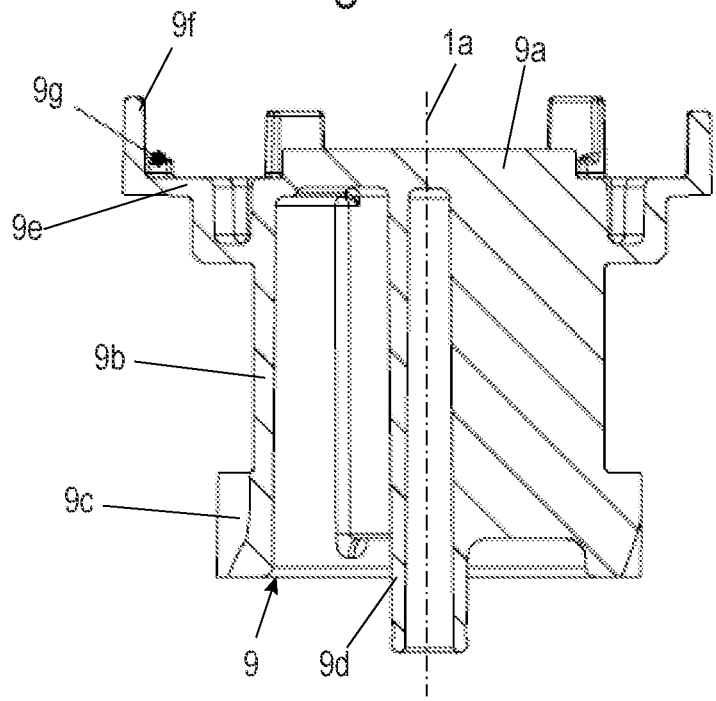
Figure 13:
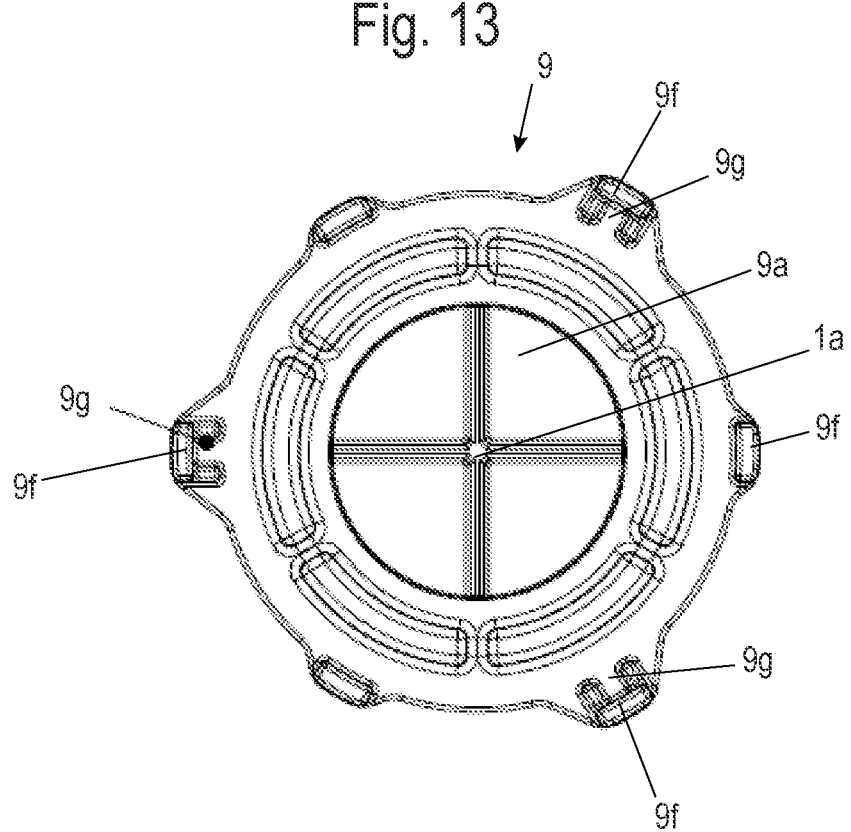

FIG. 11 shows a schematic top view of a grinding disc as the second grinding tool 8 of the second exemplary embodiment according to FIGS. 2-3. FIG. 12 shows a side view. FIG. 13 shows a schematic top view of the drive shaft 9 of the second exemplary embodiment according to FIGS. 2-3, wherein FIG. 14 shows a schematic sectional view of the drive shaft 9.

A further possibility will be indicated in which the grinding tools 2, 8 can be connected to the respective grinding disc carrier M1, M2 without screw holes or threaded blind holes. In FIGS. 11 and 12, the second grinding tool 8 is shown as an example with three latching lugs 8a as radial projections on the periphery of the second grinding tool 8.

These latching lugs 8a engage grooves 9g in the lower grinding disc carrier M2 in the carrier section 9a in such a way that the necessary torques can be transmitted. The grooves 9g are each formed here in a foot region of a lug-like projection 9f, wherein each groove 9g is fixed by lateral stops.

Since the grinding tools 2, 8 push apart in the direction of the grinding axis 1a during the grinding process, no further axial securing of the second grinding tool 8 is required. Thus, the second grinding tool 8 is merely inserted into the carrier section 9a of the drive shaft 9, which is a very assembly- and maintenance-friendly solution.

Figure 16:
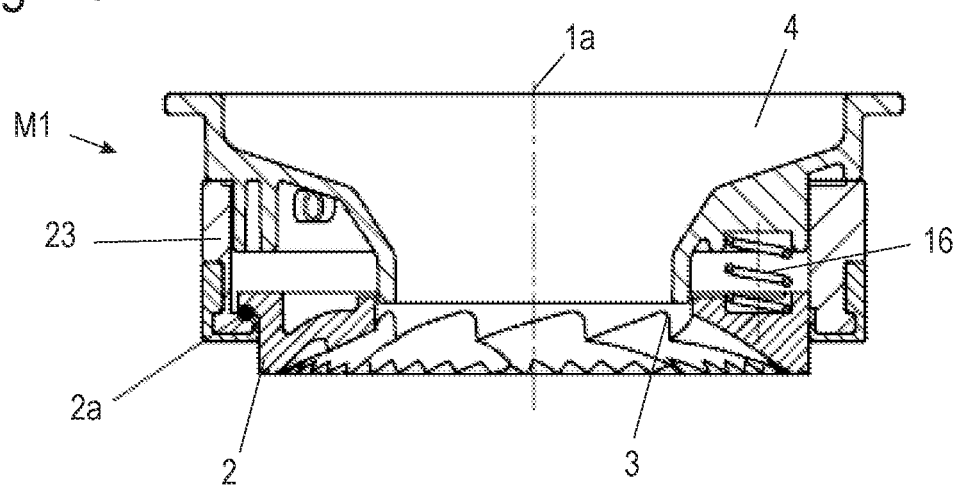
Figure 15:
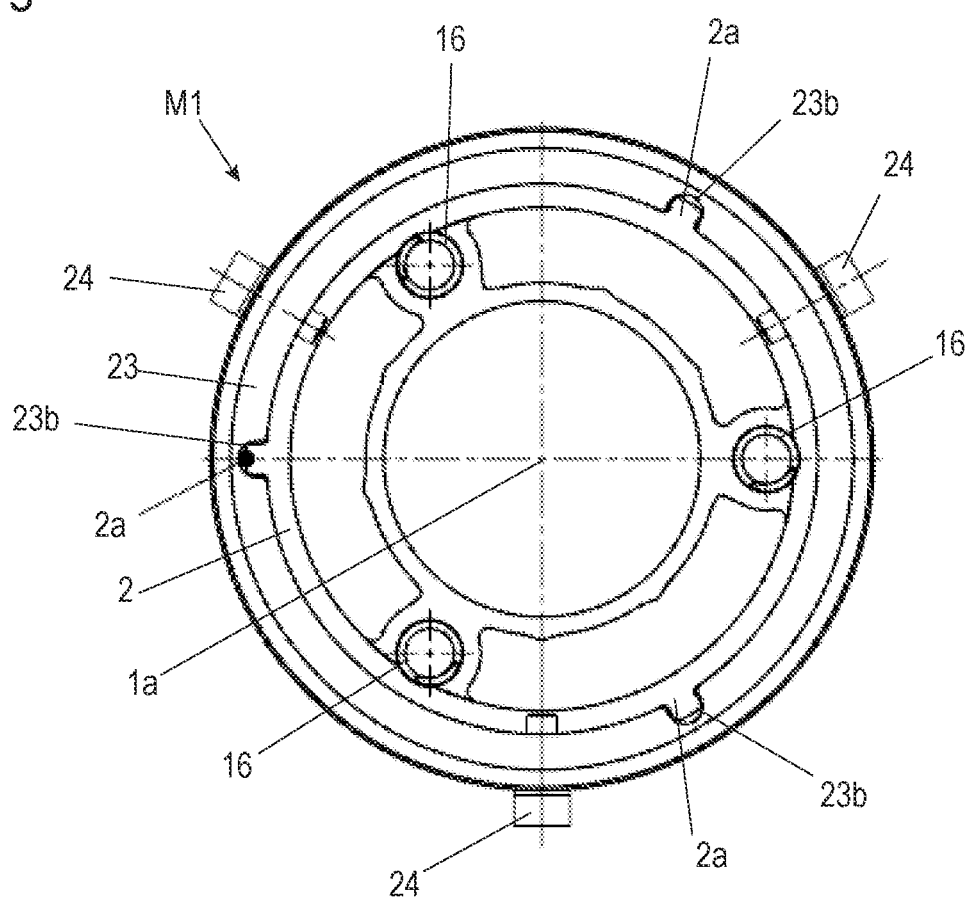

FIG. 15 shows a schematic plan view of a variation of the first grinding disc carrier M1 according to FIGS. 5-6. FIG. 16 shows a sectional view of FIG. 15.

At the upper, first grinding disc carrier M1, it is suitable for a force-controlled grinding degree adjustment to guide the latching lugs 2a of the first grinding tool 2 in grooves which, on the one hand, transmit the torque and, on the other hand, effect an axial degree of freedom against the adjustable spring pressure of the compression springs 16.

In a system having a grinder 1 without force control, a second component is required that prevents the axial movement of the first grinding tool 2. Here, the contour of the latching lugs 2a in a steel grinding disc can either be milled or bores located on the periphery can be provided with pins. On a ceramic grinding disc, the latching lugs 2a are advantageously taken into account directly in the tool.

Figure 17:
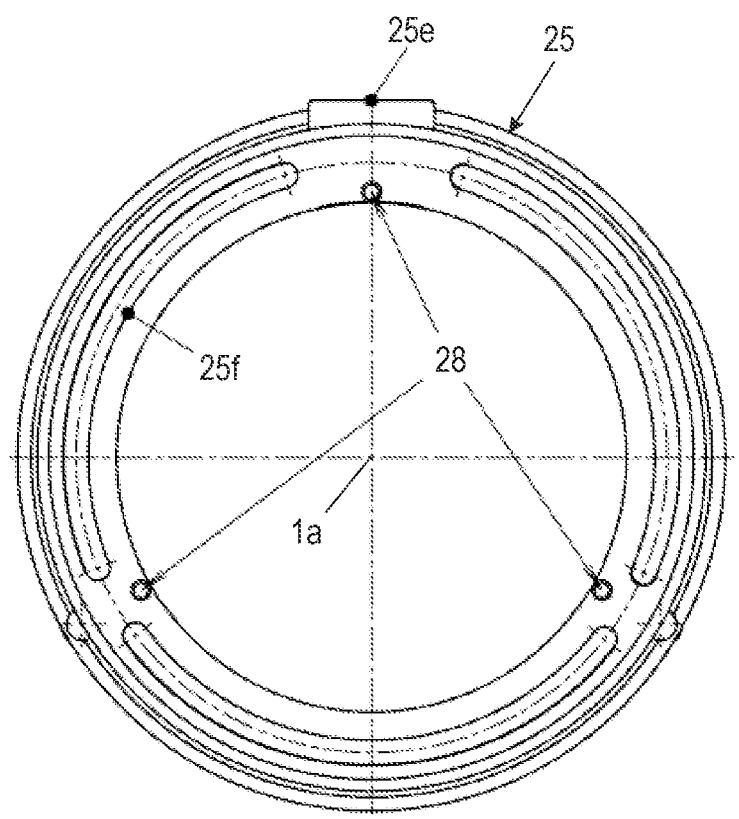

FIG. 17 shows a schematic top view of the underside of the grinding housing 25 of the second exemplary embodiment according to FIGS. 2-3. FIG. 18 shows a schematic top view of the gear housing 20, with FIG. 19 showing a section through the gear housing 20.

The grinding housing 25 has an ejection position with the ejection section 25e. This ejection position is always arranged at a certain angle to the drive motor 10 in the case of an angular gear unit (see FIG. 2). The position of the drive motor 10 is fixed to the gear housing 20 by the screw-on flange 20a. In order to nest several grinders as compactly as possible in coffee machines, it is advantageous that the ejection position can be varied in several positions on the circumference.

In the exemplary construction shown, there is an interface between the grinding housing 25 and the gear housing 20. The grinding housing 25 has three cams 28 (FIG. 17) on its underside, which engage in recesses 20f on the flange 20e of the gear housing 20 so as to transmit the necessary torques during the grinding process. These two parts, namely grinding housing 25 and gear housing 20 are bolted together with a flange solution. Via three elongated holes 25f in the grinding housing (FIG. 17) and through-holes 20g (FIGS. 18, 19) in the gear housing 20, the gear housing 20 and the grinding housing 25 can be screwed together by means of fastening elements 29 (FIG. 2).

Fifteen recesses 20f are provided on the circumference of the flange 20e of the gear housing 20, so that the ejection position of the ejection section 25e of the grinding housing 25 to the drive motor can be mounted in fifteen different positions. Five positions each can be changed in a simple manner by loosening the flange screws (fastening elements 29) and inserting the grinding housing 25 into the adjacent recesses. In order to mount the other ten positions, the fastening elements 29 must be completely unscrewed so that the two housing parts (gear housing 20 and grinding housing 25) can be placed one elongated hole 25f further.

If several positions of the grinder 1 are required in one machine or machine generation, there are great advantages with regard to maintenance and assembly because identical parts can be used. In many similar designs, the ejection position can only be changed to a limited extent or with increased effort.

Figure 20:
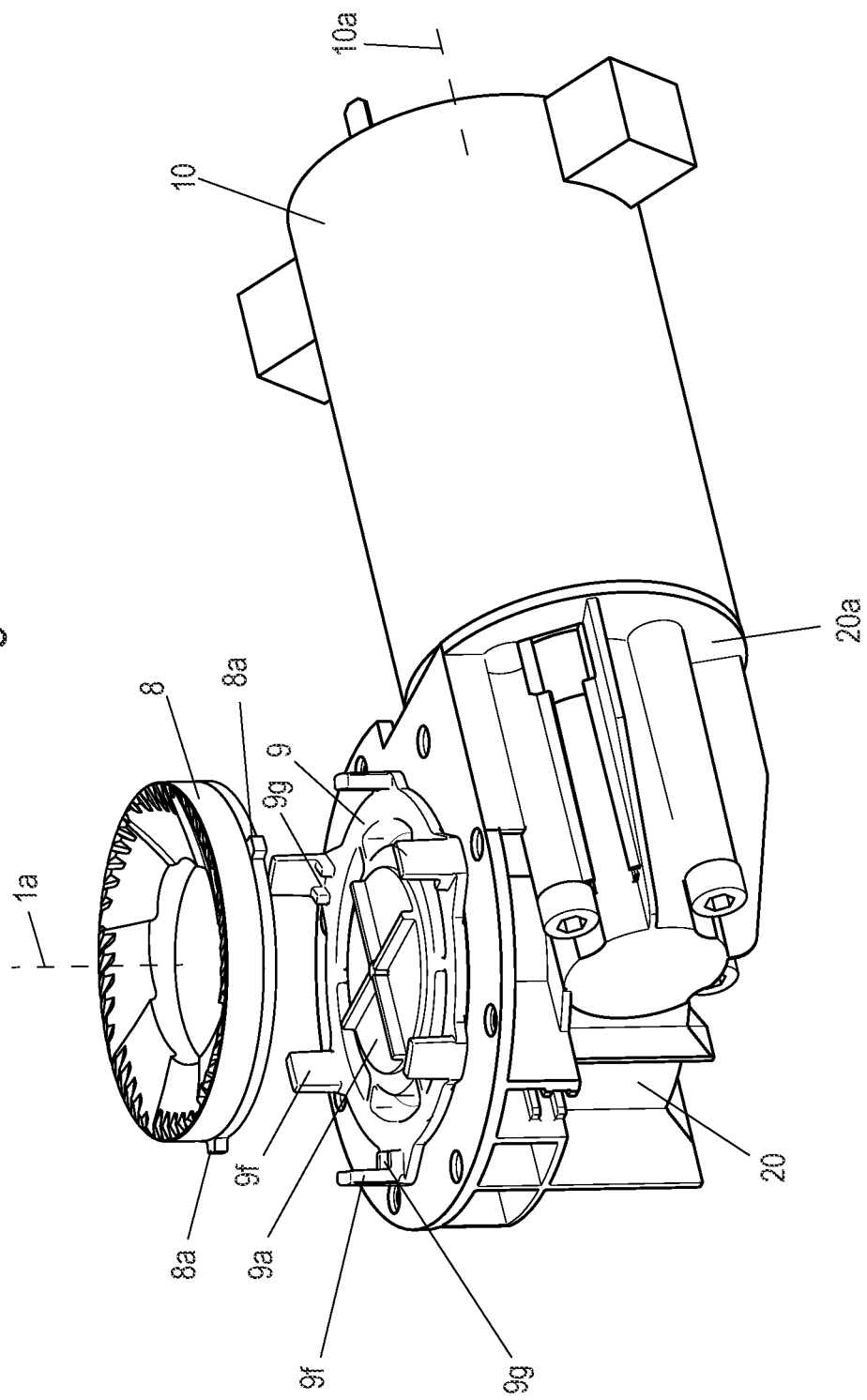
FIGS. 20-21 show schematic perspective views of a variant of the gear of the second exemplary embodiment according to FIGS. 2-3.
Figure 21:
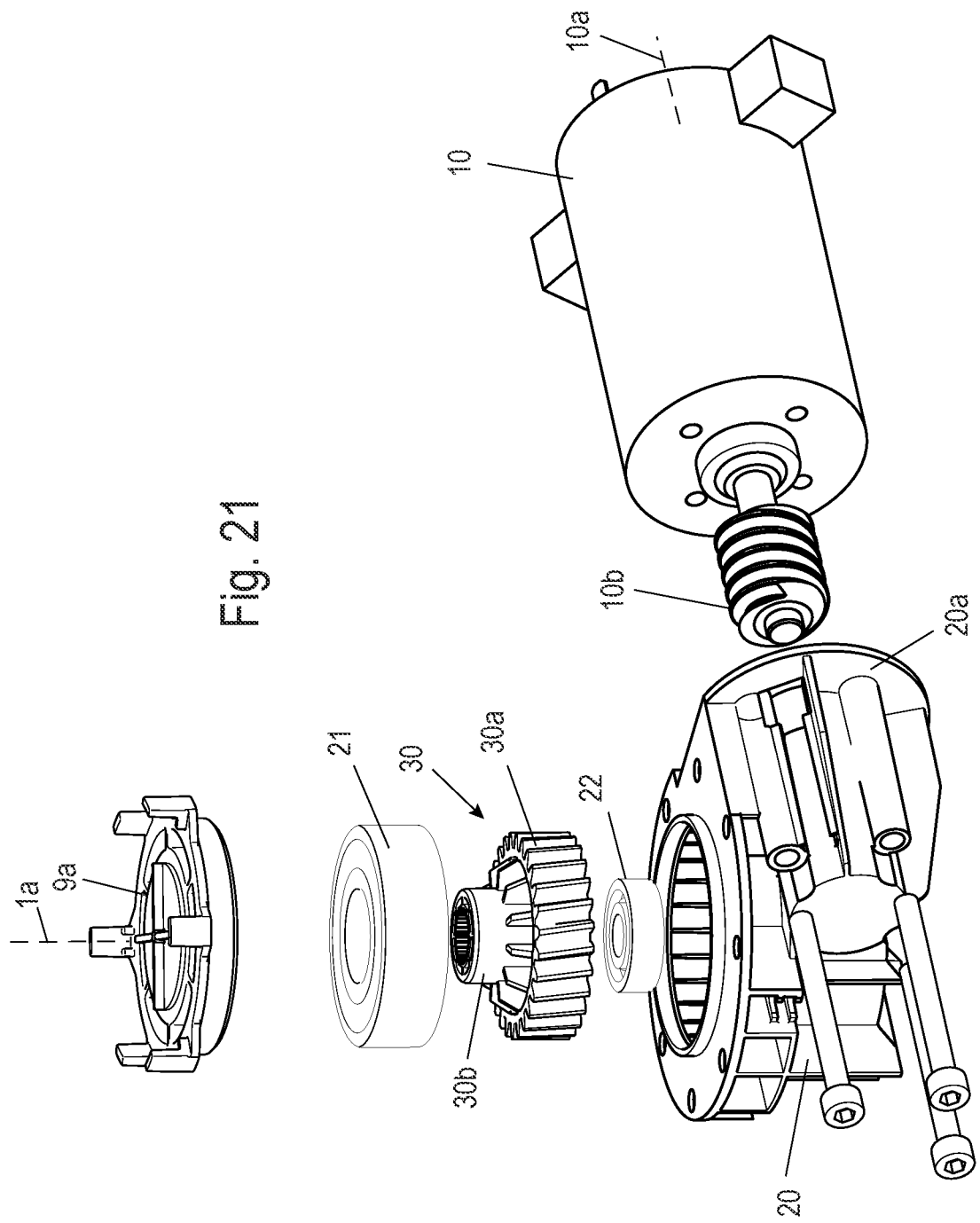
Figure 22:
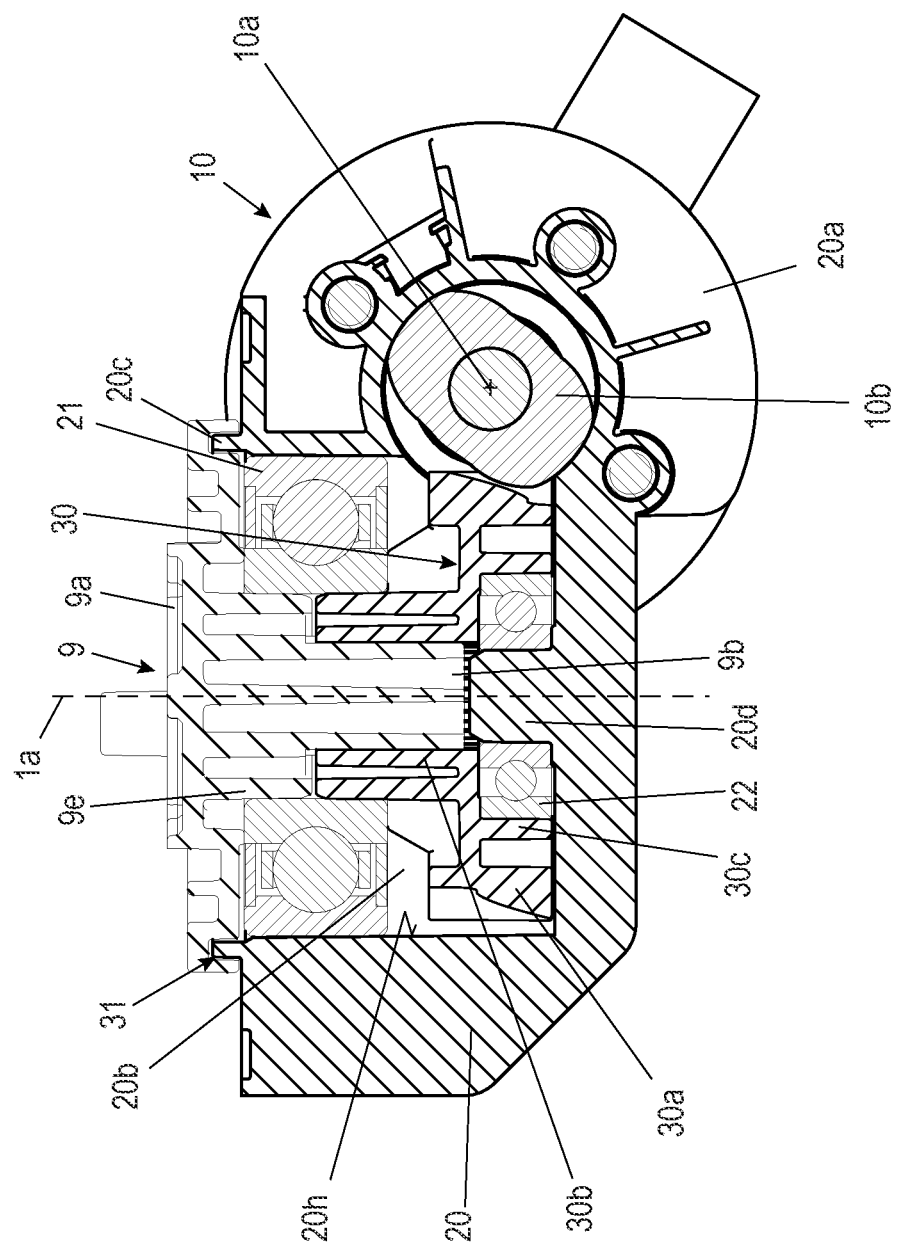
FIG. 22 shows a schematic sectional view of the variant of the gear according to FIGS. 20-21.

FIG. 20 shows a schematic perspective view of a variant of the gear of the second exemplary embodiment according to FIGS. 2-3. FIG. 21 shows a schematic perspective exploded view of the variant of the gear according to FIG. 20. FIG. 22 shows a schematic sectional view of the variant of the gear according to FIGS. 20-21.

The variant of the gear has a gear housing 20 which is substantially reduced in size relative to the gear of the second exemplary embodiment.

The interface between the grinding housing 25 and the gear housing 20 described above is not shown, but is readily imaginable.

The gear housing 20 of the variant has the screw-on flange 20a for the drive motor 10. In contrast to the gear of the second exemplary embodiment, the interior 20b and the bearing seats 20c and 20d are modified.

The interior 20b has a circumferential inner wall 20h in which an opening for the worm 10b of the drive motor 10 is formed. The interior 20b is provided with a circular cross-section, the upper region of which is provided as the bearing seat 20c for the upper bearing 21. The inner diameter of the inner wall 20h corresponds to the outer diameter of the outer ring of the upper bearing 21.

The lower bearing 22 is seated with its inner ring on the other bearing seat 20d. This bearing seat 20d protrudes from the bottom of the interior 20b into the interior 20b as a kind of cylindrical column. The outer diameter of the bearing seat 20d corresponds to the inner diameter of the inner ring of the lower bearing 22.

In order to be able to use a larger worm wheel (toothing 9c) with greater tooth strength (modulus) for the same grinding disc diameter, in this variant the drive shaft 9 with the carrier section 9a and the toothing 9c now formed as the toothing 30a of a worm wheel 30 from the second exemplary embodiment are designed in two parts.

The first part of the drive shaft 9 comprises the carrier section 9a having the bearing seat 9e and the body 9b, wherein the second part of the drive shaft 9 comprises the worm wheel 30 having the toothing 30a and a hub section 30b.

The upper bearing 21 is pushed with its inner ring onto a partial section of the bearing seat 9e of the carrier section 9a below the carrier section 9a. In this case, the upper bearing 21 is completely covered by the carrier section 9a arranged above it, wherein a circumferential collar of the carrier section 9a projects and engages with a circumferential web section of the bearing seat 20c of the gear housing 20 projecting upwards in the axial direction in such a way that a kind of labyrinth seal 31 is formed. Sealing between the gear and the coffee dispensing area is effected via this labyrinth seal 31.

The carrier section 9a is rotationally fixedly connected to the worm wheel 30 by means of the body 9b, which is here of bolt-shaped design (FIG. 22). For this purpose, the bolt-shaped body 9b is in a rotationally fixed engagement with the hub section 30b of the worm wheel 30, for example, by means of a shaft-hub connection such as a positive connection in form of a serrated connection or splined shaft/splined hub connection or the like, whereby the assembly can be made compact and simple.

The maximum diameter of the tip circle diameter of the toothing 30a of the worm wheel 30 is then limited by the outer diameter and no longer by the inner diameter of the upper bearing 21. Advantageously, the carrier section 9a, the worm wheel 30 with the toothing 30a and the two rolling bearings 21, 22 are then pre-assembled and assembled as an assembly with the gear housing 20.

In the assembled state of the two parts of the drive shaft 9, an upper section of the hub section 30b of the worm wheel 30 forms another section of the bearing seat for the inner ring of the upper bearing 21.

In this particular embodiment, the worm wheel 30 with the toothing 30a is pressed onto the lower bearing 22 and rests with the upper bearing surface (not designated, but clearly visible in FIG. 22) on the inner ring of the upper bearing 21. The upper bearing 21 can also be, for example, a needle roller and cage assembly. In this case, no further axial securing of the drive shaft 9 with the carrier section 9a and worm wheel 30 is necessary, since the process force during the grinding process presses the carrier section 9a in the direction of the axial upper rolling bearing 21 anyway. This enables simple assembly by means of a pressing process without the use of further standard parts.

Figure 23:
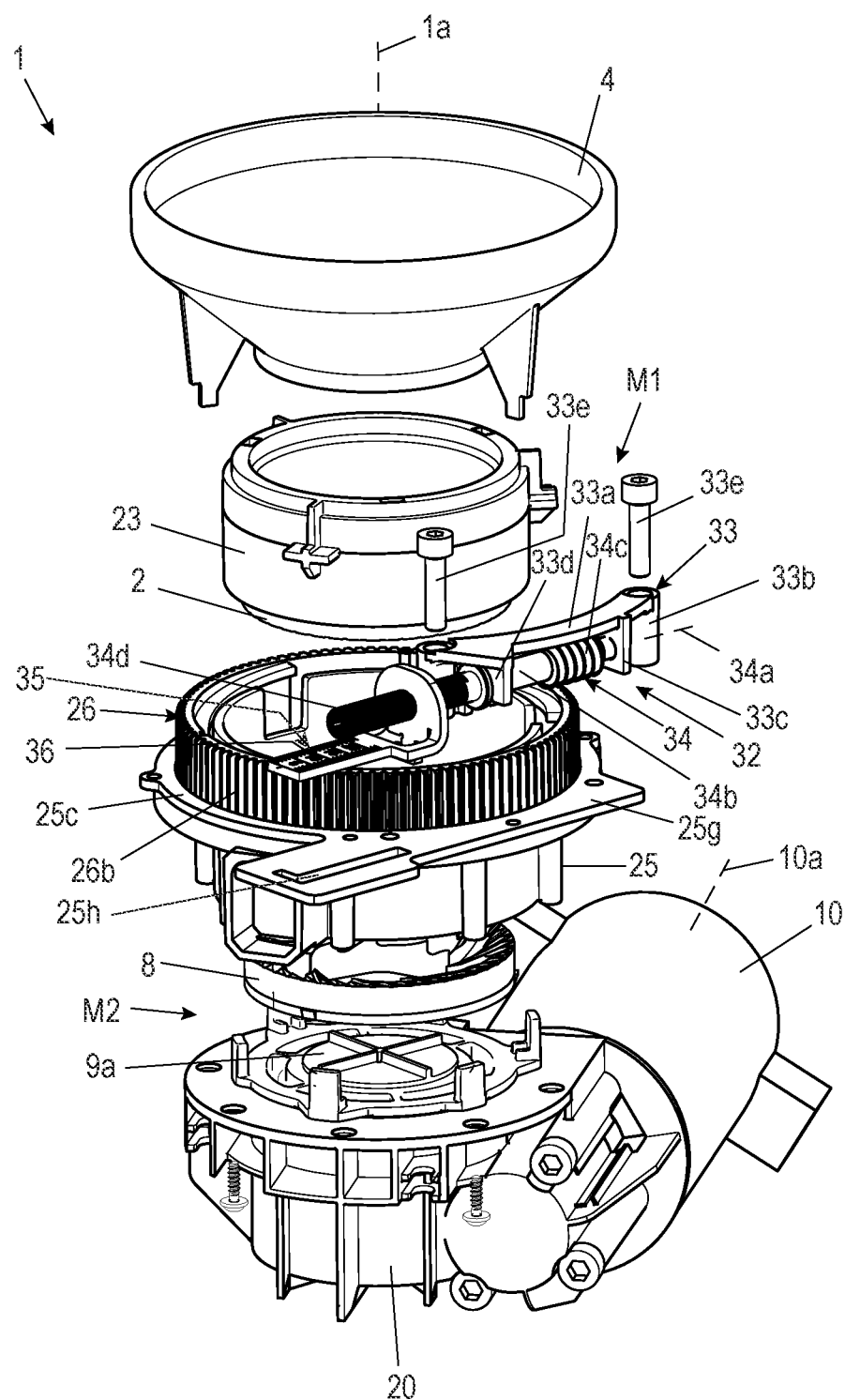
FIG. 23 shows a schematic exploded view of the second exemplary embodiment with the variant of the gear according to FIGS. 20-22 and with a grinding degree indicator.
Figure 24:
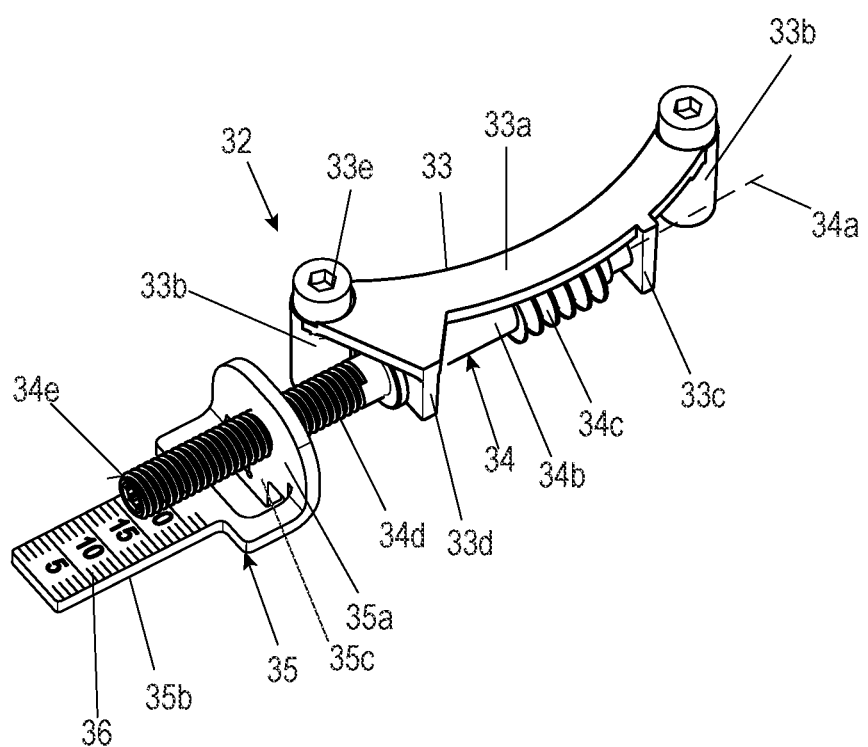
FIG. 24 shows an enlarged schematic perspective view of the grinding degree indicator according to FIG. 23.

FIG. 23 shows a schematic exploded view of the second exemplary embodiment with the variant of the gear shown in FIGS. 20-22 and with a grinding degree indicator 32. FIG. 24 shows an enlarged schematic perspective view of the grinding degree indicator 32 according to FIG. 23.

It is common to change the degree of grinding of a coffee grinder (here grinder 1) by rotating the upper, i.e. the first grinding disc carrier M1, around the grinder axis 1 a. This is realized in a thread or a ramp. Often, a worm gear is located between an adjusting rim (adjusting ring 26) of the first grinding tool 2 and an adjusting worm (not shown, but easily imaginable). The adjusting worm allows the adjusting ring 26 to be adjusted continuously, but without any indication as to the current position of the first grinding tool 2 in a vertical position with respect to the grinding axis 1a, since the adjusting worm is rotated by more than 360°.

For this purpose, a grinding degree indicator 32 is provided in this exemplary embodiment. This grinding degree indicator 32 is given here only by way of example; it can of course also be designed in a different embodiment.

The grinding degree indicator 32 interacts here with the adjusting device 15, in particular with the adjusting ring 26 of the adjusting device 15, in such a way that an adjusting rotary movement of the adjusting ring 26 is transmitted to the grinding degree indicator 32 by means of a transmission element. The grinding degree indicator 32 converts this input variable of the transmission element into a linear displacement variable or/and an angular variable, which in each case corresponds to the set degree of grinding and is indicated in a suitable manner by an indicator 36 of the grinding degree indicator 32.

Here, the grinding degree indicator 32 includes a holder 33, a shaft element 34, an indicator element 35, and an indicator 36.

The shaft element 34 is formed as the transmission element with a toothing 34c as input and with a movement thread 34d as output.

The holder 33 has a holding plate 33a, on the underside of which a respective fastening dome 33b and a respective downwardly projecting bearing wall 33c, 33d are attached at both ends. By means of the fastening domes 33b and associated fastening elements 33e, for example screws, the holder 33 with the grinding degree indicator 34 is fastened to a holder section 25g. The holder section 25g is here a widening of the collar 25c of the grinding housing 25. For fastening the holder 33, corresponding bores (e.g. with threads) for the fastening elements 33e are formed in the holder section 25g.

The bearing walls 33c and 33d are arranged parallel to each other and form a bearing for the shaft element 34, which is thus rotatable about a shaft axis 34a and is arranged axially secured in the holder 33 in a manner which is not shown but can be easily imagined.

The shaft element 34 has a shaft body 34b provided with the toothing 34c between the bearing walls 33c, 33d. One end of the shaft body 34b is supported in the bearing wall 33c, which is arranged on the right here. The other end of the shaft has an end face 34e and is connected to the shaft body 34b via the movement thread 34d.

The movement thread 34d interacts with the indicator element 35.

The indicator element 35 comprises a drive section 35a, a scale carrier 35b having an indicator scale 36 and a guide lug 35c. The drive section 35a is angled upwardly by 90° at one end of the scale carrier 35b facing the holder 33, and carries on its lower surface the guide lug 35c which projects downwardly by 90° with respect to the scale carrier 35b. The movement thread 34d of the shaft element 34 is screwed through the thread of the drive section 35a and extends longitudinally of the shaft axis 34a over the indicator scale 36 of the scale carrier 35b. Here, the indicator scale 36 is applied to the scale carrier 35b in an upwardly facing manner.

In the installed state, the grinding degree indicator 32 is fixed to the holder section 25g by means of its holder 33. In this regard, on the one hand, the shaft element 34 extends tangentially to the adjusting ring 26 in such a manner that the toothing 34c of the shaft element 34 is in engagement with the external toothing 26b of the adjusting ring 26. The external toothing 26b of the adjusting ring 26 and the toothing 34c of the shaft element thus correspond to each other. And on the other hand, the guide lug 35c is accommodated in a slidably guided manner in a groove 25h of the holder section 25g of the grinding housing 25. The groove 25h extends parallel to the shaft axis 34a of the shaft element 34 and, like the latter, tangentially to the adjusting ring 26.

Here, for identifying the grinding degree position, in this exemplary embodiment according to FIGS. 23 and 24, a rotational movement of the shaft element 34 about its shaft axis 34a is generated by the adjusting rotational movement of the adjusting ring 26 via its external toothing 26b, which are engaged with the toothing 34c of the shaft element 34. In this case, the rotational movement of the shaft element 34 produces a linear movement of the indicator element 35 by means of the movement thread 34d which engages with the drive section 35a of the indicator element 35, which in turn is also rotationally fixed by means of the guide lug 35c which is rotationally fixed in the groove 25h. In this way, the scale carrier 35b is axially displaced with respect to the shaft axis 34a. The end face 34e of the shaft element 34, in conjunction with the indicator scale 36, serves as a means for reading the degree of grinding on the indicator scale 36.

At the respective end of the groove 25h, the guide lug 35c of the indicator element 35 comes to a respective stop. These stops limit the adjustment travel of the indicator element 35 and thus the rotational adjustment movement of the adjusting ring 26. In other words, these stops simultaneously represent the stop for the minimum and maximum degree of grinding of the grinder 1.

Another embodiment (not shown, but easily imaginable) of the grinding degree indicator 32 is conceivable, wherein instead of the shaft element 34, a gearwheel, for example with spur toothing, meshing with the external toothing 26b of the adjusting ring 26, is rotated during an adjusting rotational movement of the adjusting ring 26. This gearwheel can then rotate, for example about an axis which is parallel to the grinder axis 1a, and the degree of grinding can be uniquely assigned depending on the angular position of the gearwheel, for example on the basis of an angular scale on the gearwheel. The gearwheel may also be in engagement with further gearwheels of a gear to effect a gear reduction or gear transmission ratio for the indication. To implement the stops, the gearwheel or the output gearwheel of the gear with the angular scale may be rotatable, for example by means of a pin, between two stops.

Moreover, in an embodiment not shown, the grinding degree indicator 32 can be used simultaneously to adjust the adjusting ring 26. In this case, the external toothing 26b of the adjusting ring 26 are in the form of a worm gear toothing, wherein the toothing 34c of the shaft element 34 is the associated worm and is driven by an adjusting drive.

In the case of the gearwheel in place of the toothing 34c, this gearwheel may of course be driven to adjust the adjusting ring 26.

A drive of the shaft element 34 or the gearwheel for adjusting the adjusting ring 26 can be realized in many ways, for example by means of a stepper motor.

The above described change of the degree of grinding, i.e. the adjustment or rotation of the first grinding disc carrier M1 around the grinder axis 1a can be performed in all operating and rest positions of the grinder 1.

The invention is not limited by the above exemplary embodiment, but is modifiable within the scope of the claims.

For example, it is conceivable that the receiving geometries of the grinding tools 2, 8 are injection-molded with plastic.

Several springs 16, in particular compression springs, may also be provided. These can be arranged symmetrically about the grinder axis 1a, about which the grinding tool 2, 8 rotates, in order to achieve an optimally distributed application of force.

It is also conceivable to use tension springs instead of or together with compression springs.

It is also conceivable that instead of the worm gear between the drive motor 10 and the drive shaft 9, other types of gear with spur gears, bevel gears, helical gears can be used. To achieve a high reduction ratio with a spur gear, it is also possible to use a pinion with a minimum number of teeth.

LIST OF REFERENCE SIGNS

1 Grinder
1a Grinder axis
2 First grinding tool
2a Latching lug
3 Aperture
4 Feed hopper
4a Collar
4b Projection
5 Coffee bean
6 Depression
7 Grinding edge
8 Second grinding tool
9a Latching lug
9 Drive shaft
9a Carrier section
9b Body
9c Toothing
9d Dome
9e Bearing seat
9f Projection
9g Groove
10 Motor
10a Motor shaft
10b Toothing
11 Depression
12 Grinding edge
13 Grinding chamber 14 Grinding gap
15 Force-generating device
16 Compression spring
17 Adjusting device
18 Control and/or evaluation unit
19 Fastening element
19a Washer
20 Gear housing
20a Screw-on flange
20b Interior
20c, 20d Bearing seat
20e Flange
20f Depression
20g Through-hole
20h Inner wall
21, 22 Bearing
22a Securing element
23 Carrier
23a Lug
23b Groove
24 Fastening element
25 Grinding housing
25a Bottom section
25b Receiving section
25c Collar
25d Opening
25e Ejection section
25f Elongated hole
25g Holder section
25h Guide groove
26 Adjusting ring
26a Wall
26b External toothing
26c Ramp
26d Collar
27 Adjusting element
27a Ring section
27b Tooth section
27c Actuating section
28 Cam
29 Fastening element
30 Worm wheel
30a Toothing
30b Hub section
30c Bearing seat
31 Labyrinth seal
32 Grinding degree indicator
33 Holder
33a Holding plate
33b Fastening dome
33c, 33d Bearing wall
33e Fastening element
34 Shaft element
34a Shaft axis
34b Shaft body
34c Toothing
34d Movement thread
34e End faces
35 Indicator element
35a Drive section
35b Scale carrier
35c Guide lug
36 Indicator scale
AE Drive unit
E Plane
F Force
M1, M2 Grinding disc carrier
X Pretensioning distance

What is claimed is:

1. A grinder (1) for grinding coffee beans (5), wherein the grinder (1) comprises two grinding disc carriers (M1, M2) each with a grinding tool (2, 8), a drive unit (AE) and at least one force-generating device (15), wherein the at least one force-generating device (15) is configured for applying an adjustable force F to a first grinding tool (2) of the grinding tools or a second grinding tool (8) of the grinding tools, which is transmitted to the coffee beans (5), wherein the force F is directed in such a way that the force F presses the respective grinding tool (2, 8), to which the force F is applied, in a direction of the respective other grinding tool (2, 8), and wherein the at least one force-generating device (15) is provided with an adjusting device (17) for the force F, wherein the adjusting device (17) comprises an adjusting ring (26) having a ramp (26c) and an adjusting element (27), wherein the ramp (26c) is in engagement with the first grinding disc carrier (M1).

2. The grinder (1) according to claim 1, wherein the first grinding disc carrier (M1) comprises the first grinding tool (2), a feed hopper (4), and a carrier (23), wherein the carrier (23) is in engagement with the ramp (26c) of the adjusting ring (26), and wherein the first grinding tool (2) is arranged with an axial degree of freedom and is connected to the feed hopper (4) via at least one spring.

3. The grinder (1) according to claim 2, wherein the at least one spring exerts an axial force on the first grinding tool (2), wherein a pretensioning force of the at least one spring is adjustable by means of the adjusting ring (26) of the adjusting device (17).

4. The grinder (1) according to claim 2, wherein the force-generating device (15) comprises at least the one spring and the adjusting device (17) for adjusting a pretensioning force of the spring.

5. The grinder (1) according to claim 4, wherein the grinder (1) and the adjusting device (17), for adjusting a pretensioning force of the spring, are operated by a control and/or evaluation unit (18) as a function of
 a) the coffee beans,
 b) temperature of the grinder (1) and/or
 c) a degree of wear of the grinder (1).

6. The grinder (1) according to claim 1, wherein the adjusting ring (26) is rotatably mounted on a grinding housing (25) of the grinder (1).

7. The grinder (1) according to claim 6, wherein the adjusting ring (26) surrounds a receiving section (25b) of the grinding housing (25) and is rotatably guided on a circumferential collar (25c) of the grinding housing (25), wherein the first grinding disc carrier (M1) is arranged in the receiving section (25b) of the grinding housing (25).

8. The grinder (1) according to claim 7, wherein the adjusting ring (26) is provided with an external toothing (26b) with which the adjusting element (27) is in engagement.

9. The grinder (1) according to claim 1, wherein the force-generating device (15) is based on a pneumatic operating principle, on a fluid operating principle or/and on an electromagnetic operating principle.

10. The grinder (1) according to claim 1, wherein the adjusting device (17) is independent of an operating or resting state of the grinder (1).

11. The grinder (1) according to claim 1, wherein the grinder (1) is designed as a disc or roller or cone grinder.

12. The grinder (1) according to claim 1, wherein during operation of the grinder (1) one of the two grinding tools (2 or 8) is stationary and the second of the two grinding tools (2 or 8) is rotatably driven by the drive unit (AE).

13. The grinder (1) according to claim 1, wherein the drive unit (AE) comprises a drive shaft (9), a gear housing (20) and a drive motor (20), wherein the drive shaft (9) is coupled to the second grinding disc carrier (M2) for driving the second grinding tool (8), is in engagement with the drive motor (10) indirectly via a gear or directly, and is rotatably mounted in the gear housing (20).

14. The grinder (1) according to claim 1, wherein the grinder (1) comprises a grinding degree indicator (32) with an indicator (36).

15. The grinder (1) according to claim 14, wherein the grinding degree indicator (32) cooperates with the adjusting device (15) and indicates a degree of grinding of the grinder (1) by means of an indicator (36).

16. The grinder (1) according to claim 15, wherein the grinding degree indicator (32) cooperates with the external toothing (26b) of an adjusting ring (26) of the adjusting device (15).

17. The grinder (1) according to claim 14, wherein the grinding degree indicator (32) comprises at least one stop defining a minimum or/and maximum degree of grinding to be produced.

18. A coffee machine having at least one grinder (1) according to claim 1.

19. A grinder (1) for grinding coffee beans (5), wherein the grinder (1) comprises two grinding disc carriers (M1, M2) each with a grinding tool (2, 8), a drive unit (AE) and at least one force-generating device (15), wherein the at least one force-generating device (15) is configured for applying an adjustable force F to a first grinding tool (2) of the grinding tools or a second grinding tool (8) of the grinding tools, which is transmitted to the coffee beans (5), wherein the force F is directed in such a way that the force F presses the respective grinding tool (2, 8), to which the force F is applied, in a direction of the respective other grinding tool (2, 8), and wherein the at least one force-generating device (15) is provided with an adjusting device (17) for the force F,
wherein the first grinding tool (2) and the second grinding tool (8) are coupled to a respective grinding tool carrier (26, 9a) via latching lugs (2a, 8a) on a periphery of the respective grinding tool (2, 8).

20. A grinder (1) for grinding coffee beans (5), wherein the grinder (1) comprises two grinding disc carriers (M1, M2) each with a grinding tool (2, 8), a drive unit (AE) and at least one force-generating device (15), wherein the at least one force-generating device (15) is configured for applying an adjustable force F to a first grinding tool (2) of the grinding tolls or a second grinding tool (8) of the grinding tools, which is transmitted to the coffee beans (5), wherein the force F is directed in such a way that the force F presses the respective grinding tool (2, 8), to which the force F is applied, in a direction of the respective other grinding tool (2, 8), and wherein the at least one force-generating device (15) is provided with an adjusting device (17) for the force F,
wherein the drive unit (AE) comprises a drive shaft (9), a gear housing (20) and a drive motor (20), wherein the drive shaft (9) is coupled to the second grinding disc carrier (M2) for driving the second grinding tool (8), is in engagement with the drive motor (10) indirectly via a gear or directly, and is rotatably mounted in the gear housing (20), and
wherein the drive shaft (9) is in engagement with the drive motor (10) via a worm gear, wherein the drive shaft (9) is connected to a worm wheel (9c) of the worm gear, and in that the drive shaft (9) is in engagement with the second grinding tool (8) via a carrier section (9a).

21. The grinder (1) according to claim 20, wherein the drive shaft (9) is integrally formed with the worm wheel (9c) and the carrier section (9a).

22. The grinder (1) according to claim 20, wherein the drive shaft (9) is formed in two parts, wherein a first part of the drive shaft (9) comprises the carrier section (9a), and wherein a second part of the drive shaft (9) comprises a worm wheel (30).

23. A grinder (1) for grinding coffee beans (5), wherein the grinder (1) comprises two grinding disc carriers (M1, M2) each with a grinding tool (2, 8), a drive unit (AE) and at least one force-generating device (15), wherein the at least one force-generating device (15) is configured for applying an adjustable force F to a first grinding tool (2) of the grinding tools or a second grinding tool (8) of the grinding tools, which is transmitted to the coffee beans (5), wherein the force F is directed in such a way that the force F presses the respective grinding tool (2, 8), to which the force F is applied, in a direction of the respective other grinding tool (2, 8), and wherein the at least one force-generating device (15) is provided with an adjusting device (17) for the force F,
wherein the drive unit (AE) comprises a drive shaft (9), a gear housing (20) and a drive motor (20), wherein the drive shaft (9) is coupled to the second grinding disc carrier (M2) for driving the second grinding tool (8), is in engagement with the drive motor (10) indirectly via a gear or directly, and is rotatably mounted in the gear housing (20), and
wherein the gear housing (20) is connected to a grinding housing (25) of the grinder (1), wherein different positions of an ejection section (25e) of the grinding housing (25) are fixed relative to a position of the drive motor (10) of the gear housing (20).

24. The grinder (1) according to claim 23, wherein the different positions of the ejection section (25e) of the grinding housing (25) are defined as different angular positions relative to a grinder axis (1a) by depressions (20f) or recesses which are formed in a flange (20e) of the gear housing (20) and are in engagement with respective cams (28) or pins of the grinding housing (25).

25. A grinder (1) for grinding coffee beans (5), wherein the grinder (1) comprises two grinding disc carriers (M1, M2) each with a grinding tool (2, 8), a drive unit (AE) and at least one force-generating device (15), wherein the at least one force-generating device (15) is configured for applying an adjustable force F to a first grinding tool (2) of the grinding tools or a second grinding tool (8) of the grinding tools, which is transmitted to the coffee beans (5), wherein the force F is directed in such a way that the force F presses the respective grinding tool (2, 8), to which the force F is applied, in a direction of the respective other grinding tool (2, 8), and wherein the at least one force-generating device (15) is provided with an adjusting device (17) for the force F,
wherein the grinder (1) comprises a grinding degree indicator (32) with an indicator (36), and
wherein the grinding degree indicator (32) comprises an adjusting drive and adjusts the adjusting ring (26) of the adjusting device (15) to adjust a degree of grinding.

* * * * *